United States Patent
Aoki

(10) Patent No.: US 6,757,499 B1
(45) Date of Patent: Jun. 29, 2004

(54) OPTICAL TRANSMITTER AND OPTICAL SIGNAL TRANSMITTER

(75) Inventor: Masahiro Aoki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 478 days.

(21) Appl. No.: 09/637,575

(22) Filed: Aug. 14, 2000

(30) Foreign Application Priority Data

Oct. 28, 1999 (JP) .......................................... 11-307302

(51) Int. Cl.[7] .......................................... H04B 10/04
(52) U.S. Cl. ...................... 398/182; 398/198; 398/196; 372/32; 372/34
(58) Field of Search ................................ 359/180–181, 359/187; 372/32, 34; 398/198, 196, 195, 182

(56) References Cited

U.S. PATENT DOCUMENTS 5,646,771 A * 7/1997 Noda .......................... 359/245
5,917,637 A * 6/1999 Ishikawa et al. ............. 359/181
5,978,395 A * 11/1999 Nomura ........................ 372/34
6,516,017 B1 * 2/2003 Matsumoto ................... 372/50

FOREIGN PATENT DOCUMENTS

JP      407106691 A  *  4/1995  ............. H01S/3/18

OTHER PUBLICATIONS

1999 General Meeting of The Institute of Electronics, Information and Communication Engineers, pp. 408–409.

* cited by examiner

Primary Examiner—Kinfe-Michael Negash
(74) Attorney, Agent, or Firm—Mattingly, Stanger & Malur, P.C.

(57) ABSTRACT

The optical transmitter includes a semiconductor laser device, and an optical modulator region optically connected to the semiconductor laser device and having the function of modulating the output light from the semiconductor laser device. The operating temperature of the optical modulator region is changed without changing the oscillation wavelength of the semiconductor laser device.

18 Claims, 22 Drawing Sheets

OPTICAL TRANSMITTER AND OPTICAL SIGNAL TRANSMITTER

BACKGROUND OF THE INVENTION

1. Field of the Invention

The present invention relates to an optical transmitter and more particularly to an optical transmitter a wavelength multiplexing optical communication system and an optical network using a plurality of pieces of signal light.

2. Related Art

Wavelength multiplexing optical communication, which transmits an optical signal with a plurality of wavelengths along the same optical transmission line, is an important technology for achieving higher performance and lower cost of communication technology and optical information processing technology. A first major object from this point of view is to control the wavelength of a light source for a plurality of channels, and a second major object is to provide an optical modulation means for achieving rapid optical modulation.

Controlling the wavelength of a light source for a plurality of channels in a wavelength multiplexing optical communication system is one of the most important techniques. The wavelength c)r frequency of each channel used is now precisely determined by an international standardization (ITU) at an interval of 50 GHz to 100 GHz (about 0.4 nm to 0.8 nm)

Light sources considered for wavelength multiplexing optical communication with wavelengths controlled in the above manner include a wavelength variable type light source wherein a plurality of channels are covered by using a semiconductor laser device with a wavelength-variable function, and a wavelength selection type light source wherein a plurality of semiconductor laser devices with different wavelengths are used. Realization of these techniques requires realization of a wavelength variable type semiconductor laser that makes it possible to sweep wavelengths efficiently, readily, and continuously, as well as a wavelength control technique for controlling a wavelength on the ITU grid with high reproducibility, or a wavelength stabilization technique for fixing a wavelength on the ITU grid over a long period of time.

On the other hand, the typical transmission speed in a long-distance main line system is currently 2.5 Gb/s to 10 Gb/s. Because of this high-speed transmission, the optical modulation system needs to be an external modulation system, in which optical modulation is performed outside of the light-emitting device, rather than a system in which modulation is performed directly by the light-emitting device. Thus the optical modulation means for achieving rapid optical modulation requires the form of a modulator-integrated light source, in which an optical modulator is monolithically integrated with a laser device. A wavelength selection type light source which, from this point of view, monolithically integrates a plurality of semiconductor laser devices having different wavelengths with an optical multiplexer, an electric field absorption type optical modulator, and the like has been reported. In this example, however, there is a problem in that the characteristics of the optical modulator are changed when the wavelength of the laser light led to the optical modulator is varied.

Incidentally, this type of wavelength multiplexing communication light source is reported in the Institute of Electronics, Information and Communication Engineers general convention SC-3-5, 1999.

As for the above-mentioned first object of controlling the wavelength of a light source for a plurality of channels, one of the major problems is how to set the wavelength of a semiconductor laser device to be used as the light source at a standard value. Currently the standard value is practically provided by the ITU grid. In order to solve the problem, the following two measures are provided for a current system. One is to monitor the wavelength of each channel and provide a wavelength stabilizing means for the light source, which feeds back the correction based on the result of monitoring to the drive of the light source. The other is to provide a spare light source device for each channel in case an individual channel device of such a complex light source should fail.

With the background of these techniques, each of a plurality of DFB (Distributed Feedback) laser devices that corresponds to each channel in the light source used for a wavelength multiplexing optical communication system needs to be built so as to fit into a specified narrow wavelength range. Therefore, there is a major problem in the yields in terms of device manufacturing.

This problem of wavelength control is a major obstacle to the achievement of smaller size and lower cost of an optical transmitter, and will also be a major object to further reduction in channel intervals and the increase in the number of channels in the future.

Next the above-mentioned second object of providing a means for rapid modulation will be dealt with. The characteristics of a current optical modulation means change mainly for the following reason. Optical modulators formed by semiconductor materials include electric field absorption type modulators, optical interference type modulators, and phase modulators. The optical modulation characteristics of these optical modulators formed by semiconductor materials, however, depend heavily on the difference between the band gap energy of the semiconductor material and the energy of the signal light (amount of detuning). Therefore, as the wavelength of the signal light is changed, the amount of detuning of the optical modulator is greatly changed.

In addition, chirping in particular becomes a problem in the case of long-distance transmission. It is desirable from this point of view that the chirping parameter of an optical modulator can be varied according to the transmission specifications. In the case of an electric field absorption type optical modulator, the chirping parameter can be changed by offset voltage. In this case, however, the laser light output is reduced especially when the offset voltage is increased. This is caused by optical absorption in the optical wave guide of the optical modulator.

A first object of the present invention is to provide an optical transmitter that will solve problems such as the wavelength control of a light source, the provision of an optical modulation means for achieving rapid optical modulation, and the control of the chirping characteristics of an optical modulator.

A second object of the present invention is to provide an optical transmitter suitable for realizing a light source for wavelength multiplexing communication with high reproducibility and provide a wavelength multiplexing transmission apparatus using the optical transmitter. The second object of the present invention will be achieved by using a simple method. The method will also enable minute tuning in optical communication, and enable especially the tuning of a wavelength standard channel that conforms to the ITU grid.

A third object of the present invention is to provide an optical transmitter suitable for long-distance transmission and a simple means for realizing the transmitter. More specifically, it controls the chirping parameter of a light source including an optical modulator.

The present invention will be useful especially for a complex light source using a semiconductor laser device with an external modulator monolithically integrated.

SUMMARY OF THE INVENTION

First the basic technical concept of the present invention will be described. The basic configuration of the present invention is a combination of a wavelength variable type light source or an integrated type multiple wavelength light source and an optical modulator. The optical combination form of the light source and the optical modulator may be either a form in which they are separated from each other hybrid integration) or a form that monolithically integrates each other (monolithic integration). Incidentally, the configuration itself in which a light source that emits light with a plurality of wavelengths and an optical modulator are integrated on a single substrate is already known. Specifically, in such an apparatus, part of the output light from a wavelength variable type light source or an integrated type multiple wavelength light source is led to an optical modulator to generate an optical signal by the on and off of the optical modulator.

Another object of the present invention is to provide a means for locally controlling the temperature of the optical modulator in the proximity of such an optical modulator. The temperature controlling means controls the temperature of an active wave guide layer in the optical modulator to a desired value. The basic form of the present invention will also help solve problems such as the wavelength control of a light source, the provision of an optical modulation means for achieving rapid optical modulation, and the control of the chirping characteristics of an optical modulator.

In a first specific example of operation according to the present invention, the band gap wavelength of an optical modulator is varied according to and to the same degree as variations in the wavelength of an optical signal introduced into the optical modulator, for example. To illustrate a more specific embodiment of the present invention, the temperature control means at least has a means to detect the wavelength of the light incident on the optical modulator, and a means to control the operating temperature of the optical modulator based on the detected wavelength. In practical use, the temperature control means further has a means to control the operating current of the semiconductor laser device based on the detected wavelength. The means to control the operating temperature of the optical modulator varies the band gap wavelength of the optical modulator according to and to the same degree as variations in the wavelength of an optical signal introduced into the optical modulator. For example, when the wavelength of the optical signal introduced into the optical modulator is increased, the band gap wavelength of the optical modulator is increased to the same degree. The means to control the operating current of the semiconductor laser device controls minute variations in oscillation power based on the wavelength variations.

The above means make it possible to provide rapid optical modulation that enables the wavelength control of a light source. According to the present invention, variations in the optically modulated waveform can be controlled to a low level even when the wavelength of signal light is changed. Furthermore, according to the present invention, the chirping parameter is held to a specified value, and variations in the chirping parameter can be controlled to a low level. That is, the modulation characteristics of light are controlled while variations in the chirping parameter required are controlled to a low level. Thus the present invention makes it possible to provide high-quality fiber signal transmission.

Next, in the other form of operation according to the third object of the present invention, attention is directed to the chirping parameter of the optical modulator as an object to be controlled. In this case, the chirping parameter can be controlled whether the light emitter is of the wavelength variable type or of the wavelength fixed type. Specifically, in the other form of operation according to the present invention, the wavelength of laser light is practically constant, and a temperature control means is provided in the proximity of the optical modulator, the temperature control means making it possible to change the chirping parameter of the optical modulator by controlling the temperature of the optical modulator.

The basic concepts of the present invention has been described. Next essential aspects of the present invention will be described.

According to a first aspect of the present invention, there is provided an optical transmitter comprising: a semiconductor laser device; an optical modulator region optically connected to the semiconductor laser device and having the function of modulating the output light from the semiconductor laser device; and a means for changing the operating temperature of the optical modulator region without changing the oscillation wavelength of the semiconductor laser device.

Or there is provided an optical transmitter comprising: a semiconductor laser device; an optical modulator region optically connected to the semiconductor laser device and having the function of modulating the output light from the semiconductor laser device; and a means for changing the operating temperature of the optical modulator region while maintaining a desired oscillation wavelength of the semiconductor laser device.

According to a second aspect of the present invention, there is provided an optical transmitter comprising: a semiconductor laser device; an optical modulator region optically connected to the semiconductor laser device and having the function of modulating the output light from the semiconductor laser device; and a means for externally changing the oscillation wavelength of the semiconductor laser device, and for changing the operating temperature of the optical modulator region without changing the oscillation wavelength of the semiconductor laser device.

Or there is provided an optical transmitter comprising: a semiconductor laser device; an optical modulator region optically connected to the semiconductor laser device and having the function of modulating the output light from the semiconductor laser device; and a means for externally changing the oscillation wavelength of the semiconductor laser device, and for changing the operating temperature of the optical modulator region while maintaining a desired oscillation wavelength of the semiconductor laser device.

According to a third aspect of the present invention, there is provided an optical transmitter comprising: a semiconductor laser device; an optical modulator region optically connected to the semiconductor laser device and having the function of modulating the output light from the semiconductor laser device; and a means for controlling the modulation characteristics of the optical modulator as the wavelength of the light incident on the optical modulator region is changed.

According to a fourth aspect of the present invention, there is provided an optical transmitter comprising: a semiconductor laser device; an optical modulator region optically connected to the semiconductor laser device and having the function of modulating the output light from the semiconductor laser device; and a means for externally changing the oscillation wavelength of the semiconductor laser device, and for controlling the modulation characteristics of the optical modulator as the wavelength of the light incident on the optical modulator region is changed.

According to a fifth aspect of the present invention, there are provided the optical transmitters wherein a heating element serves as the means for controlling the modulation characteristics of the optical modulator as the wavelength of the light incident on the optical modulator region is changed. A typical example of the heating element is a heater.

The above aspects of the present invention are applicable in both cases where the semiconductor laser device is the one with a single fixed wavelength and where it is a wavelength multiplexing semiconductor laser device. In these cases, it is important to locally change the temperature of the optical modulator. On the other hand, it is also important that the oscillation wavelength of the semiconductor laser device be practically set at a desired value. Thus it is required that the temperature of the optical modulator region be controlled without changing the oscillation wavelength from the semiconductor laser device. In other words, in the above aspects of the present invention the temperature of the optical modulator region must be controlled without changing the chirping parameter ($\alpha p$).

Other aspects of the present invention described below are provided for the third object of the present invention.

In the above-described aspects of the present invention provided for the second object, the temperature of the optical modulator region is controlled in such a way that the chirping parameter ($\alpha p$) is not changed. However, in order to achieve the third object of the present invention, the chirping parameter is adjusted to a desired value. This renders these aspects of the present invention useful for multiple wavelength long-distance transmission.

Specifically, according to another aspect of the present invention, there is provided an optical transmitter comprising: a semiconductor laser device; an optical modulator region optically connected to the semiconductor laser device and having the function of modulating the output light from the semiconductor laser device; and a means for changing the operating temperature of the the optical modulator region without practically changing the oscillation wavelength of the semiconductor laser device, and adjusting the chirping parameter to a desired value. Of course in this case, the optical modulator has specified modulation characteristics.

According to another aspect of the present invention, there is provided an optical transmitter comprising: a semiconductor laser device; an optical modulator region optically connected to the semiconductor laser device and having the function of modulating the output light from the semiconductor laser device; and a means for externally changing the oscillation wavelength of the semiconductor laser device, and for changing the operating temperature of the optical modulator region without changing the oscillation wavelength of the semiconductor laser device and adjusting the chirping parameter to a desired value.

According to another aspect of the present invention, there is provided an optical transmitter comprising: a semiconductor laser device; at optical modulator region optically connected to the semiconductor laser device and having the function of modulating the output light from the semiconductor laser device; and a means for externally changing the oscillation wavelength of the semiconductor laser device, and for changing the operating temperature of the optical modulator region while maintaining the oscillation wavelength of the semiconductor laser device within ±1 nm.

According to another aspect of the present invention, there is provided an optical transmitter comprising a means for adjusting the chirping parameter of the optical modulator to a desired value by changing the operating temperature of the optical modulator.

The optical modulator, which is useful for inventions pertinent to the above-described optical transmitter of the present invention, controls a signal in a wavelength band in the proximity of the band gap in the light-emitting active region of the semiconductor light-emitting device whose light is made incident on the optical modulator. Optical modulators comprising such semiconductor materials include electric field absorption type modulators, optical interference type modulators, and phase modulators. The basic configuration of these optical modulators can be sufficiently realized by using normal materials, except for temperature control means.

In addition, the specific configuration of the above-mentioned semiconductor laser device can be selected as desired, depending on the purpose. For example, the configurations of the semiconductor laser device include the DFB (Distributed Feedback) type and the DBR (Distributed Bragg Reflection) type, each of which has a normal diffraction grating, or the one with a diffraction grating using an array wave guide. The active layer region can be configured as commonly known structures, depending on the purpose. The structures of the active layer region generally include a quantum-well structure, a multi-quantum well structure, a strained quantum-well structure, and a strain compensation type quantum-well structure. Furthermore, the emitted light can be used regardless of whether it is non-modulated light or modulated light.

In addition, it is practical to mount the entire module of an optical transmitter according to the present invention on a temperature control means or, for example, a Peltier element. Temperature stabilization by means of a Peltier element or the like is a common technique employed in semiconductor laser devices. However, the present invention is intended to locally control the temperature of the semiconductor laser device and the optical modulator region, independently of the temperature control by a temperature stabilization means provided for the entire module.

An optical transmitter or an optical transmission system according to the present invention will be described below.

The optical transmitters described above are useful in realizing a wavelength multiplexing optical communication apparatus which transmits information by propagating a light wave signal with at least two different wavelengths or more on the same optical transmission line. Also, the optical transmitters for the above wavelength multiplexing optical communication apparatus are useful especially when the interval between adjacent channels is 50 GHz to 100 GHz. Thus the optical transmitters according to the present invention are useful in satisfying the requirements for the wavelength or frequency of a channel specified by ITU.

Moreover, in the above optical communication apparatus, the above optical transmitters are extremely useful when a spare light source that can vary its oscillation wavelength is to be provided as an alternative light source in case a failure should occur in a channel light source. More specifically, if a failure occurs in the light source of a channel, the spare light source is operated. Then the system can be readily restored by using the wavelength variable function of the spare light source to perfectly match the wavelength of the spare light source to that of the channel whose light source has failed.

Furthermore, utilization of the present invention will realize an optical transmission apparatus which comprises any one of the optical transmitters described above, wherein information is transmitted by propagating a light wave signal with at least two different wavelengths or more on the same optical transmission line, the oscillation wavelength of the light source for each channel that the optical transmitter can be made variable, and a desired channel wavelength can be changed as necessary by an external signal.

DETAILED DESCRIPTION OF THE PREFERRED EMBODIMENTS

Figure 1:
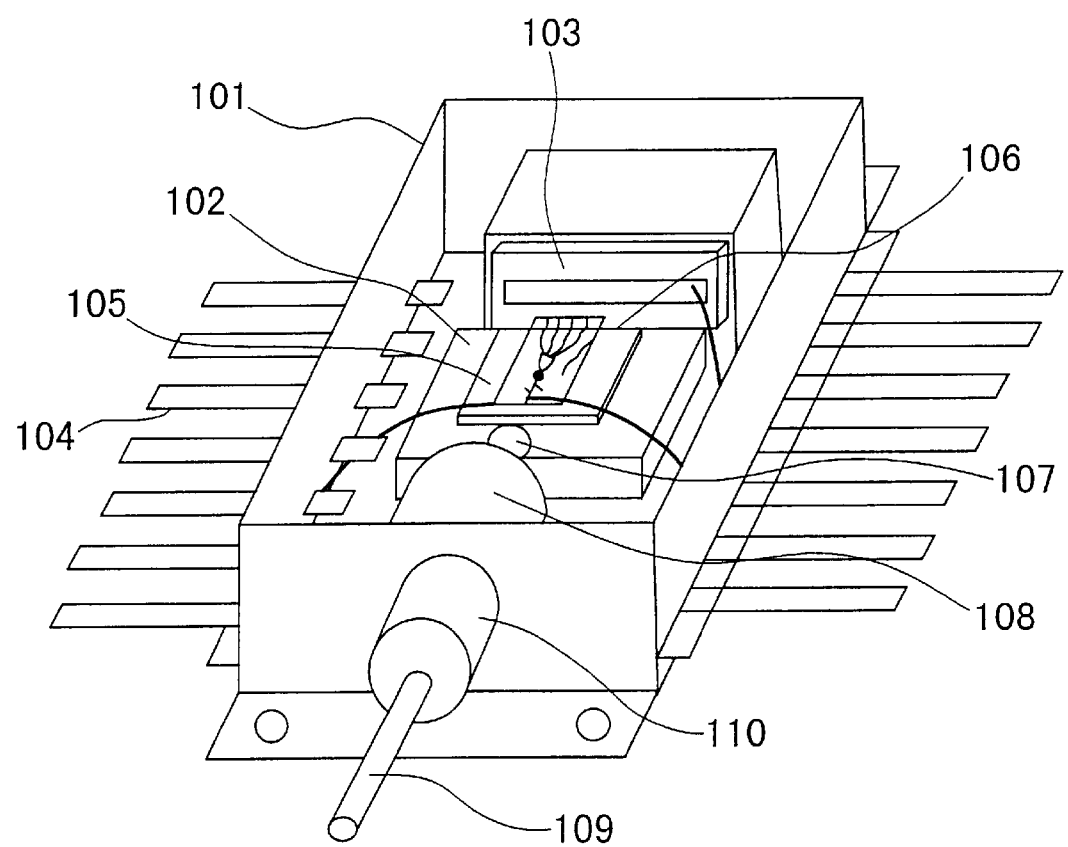
FIG. 1 is a perspective view of a multiple wavelength optical transmitter according to the present invention.

Prior to the description of embodiments of the present invention, general description of several essential embodiments will be provided. These embodiments are useful especially from a practical point of view.

Now, a first aspect of the present invention is, as described above, to vary the band gap wavelength in the optical wave guide of an optical modulator according to and to the same degree as variations in the wavelength of an optical signal introduced into the optical modulator. For this reason, it is desirable from a practical point of view that the difference in the amount of variation between the wavelength of the light incident on the optical modulator and the absorption edge wavelength of the optical modulator be always within ±7 nm. This applies to the above-mentioned embodiments of the present invention.

Of course, it is also desirable that the difference between the oscillation wavelength from a semiconductor laser device and the band gap wavelength of the semiconductor optical modulator be always controlled to within ±7 nm.

It is most practical to use a heater for a temperature control means of the present invention, as described above.

Specific materials for this heater include platinum (PT) and titanium (Ti). Although the film thickness and width of the heater materials depend on the heat power required, the thickness of about 100 nm to 400 nm is often used for platinum, and the thickness of about 50 nm to 100 nm is often used for titanium. A normal evaporation method will suffice as a method for manufacturing the heater.

With respect to the heater, it is practical to mount a thin-film heater directly on the electrode on the upper side of the wave guide of the optical modulator or on a region a few $\mu$m beside the wave guide, and adjust the operating temperature of the optical modulator by passing a current through the heater.

Moreover, according to the present invention, thin-film heaters can each be mounted directly on the electrode on the upper side of the wave guide of the semiconductor laser device and the optical modulator, or on a region a few $\mu$m beside the wave guide, as described above, and the oscillation wavelength of the laser and the operating temperature of the optical modulator can be adjusted independently of each other by passing a current through each of the heaters. In this case, or in the case of the semiconductor laser device, it is practical to mount a thin-film heater directly on the electrode on the upper side of the wave guide of the semiconductor laser device, or on a region a few $\mu$m beside the wave guide. The oscillation wavelength of the laser and the operating temperature of the optical modulator can also be adjusted simultaneously by passing a current through the heaters. The practical method of mounting the heaters for the laser part and the optical modulator part is as follows (Incidentally, it is common to make the amount of heating for the optical modulator region larger than that for the semiconductor laser part.): the ratio of the resistance value $R_{LD}$ of the heater in the proximity of the laser part to the resistance value $R_{MOD}$ of the heater in the proximity of the optical modulator is set to be 4:1 to 10:1, and the ratio between the amounts of joule heat generated when a current is passed through the heaters in series is adjusted. The above setting of these resistance values is performed in order to match the temperature dependence of the oscillation wavelength of the laser device with that of the wavelength at the absorption edge of the modulator. This relation will be described in a section on chirping.

A typical semiconductor laser device is formed with a compound semiconductor material, such as an InGaAsP material or an InGaAlAs material. The optical modulator is formed with a similar compound semiconductor material. These materials are employed to realize the wavelength of a light source for optical communication. An InP substrate is practical as a substrate for crystal growth. Furthermore, it is practical to form both the semiconductor laser device and the optical modulator with a similar compound semiconductor. This configuration is also useful from the viewpoint of manufacturing methods. However, when taking the specifications of the apparatus into account, the semiconductor laser device may be formed by an InGaAlAs material, while the optical modulator may be formed with an InGaAsP material. Moreover, the semiconductor laser device may be formed by an InGaAsP material, while the optical modulator may be formed by an InGaAlAs material. In either case, an InP substrate is practical as a substrate for crystal growth.

Needless to say, in realizing the embodiments of the present invention, various normal means can be used in combination in order to, for example, control the optical system and the optical semiconductor devices.

Examples of the normal means are as follows. One example is an optical system in which optical output is led to an optical fiber via an optical lens and an optical isolator. Another example is a temperature stabilization apparatus for maintaining the internal temperature of the optical semiconductor device at a constant level.

Another example is a monitoring photodetector for monitoring the optical output of the optical semiconductor device, or an optical output stabilization apparatus for maintaining the optical output of the optical semiconductor device at a constant level.

Another example is a wavelength stabilization apparatus for stabilizing the oscillation wavelength of the optical semiconductor device.

In addition, these various apparatus can of course be used in combination with one another if necessary. An example of this is an optical transmitter which has in combination an optical system in which optical output is led to an optical fiber via an optical lens and an optical isolator, a temperature stabilization apparatus for maintaining the internal temperature of the optical semiconductor device at a constant level, and a monitoring photodetector for monitoring the optical output of the optical semiconductor device. Another example is an optical transmitter which has in combination an optical output stabilization apparatus for maintaining the optical output of the optical semiconductor device at a constant level and a wavelength stabilization apparatus for stabilizing the oscillation wavelength of the optical semiconductor device. Yet another example is an optical transmitter which has in combination an optical system in which optical output is led to an optical fiber via an optical lens and an optical isolator, a temperature stabilization apparatus for maintaining the internal temperature of the optical semiconductor device at a constant level, and a monitoring photodetector for monitoring the optical output of the optical semiconductor device, and further has in combination an optical output stabilization apparatus for maintaining the optical output of the optical semiconductor device at a constant level and a wavelength stabilization apparatus for stabilizing the oscillation wavelength of the optical semiconductor device.

Here, chirping as mentioned above and the concept of temperature control for a laser and an optical modulator is further explained. Chirping is a phenomenon of variations in the oscillation wavelength which occurs when the rate of optical modulation exceeds a few Gb/s or so. The variations are undesirable especially for long-distance transmission. The factors of the variations involve many conditions. However, it is generally believed that in a semiconductor laser device, the carrier density varies as the driving current changes, thereby causing changes in the refractive index of the optical wave guide. Then the changes in the refractive index of the optical wave guide cause variations in the oscillation wavelength of the laser. This phenomenon is referred to as chirping.

On the other hand, because of the dispersion characteristics of the optical wave guide such as an optical fiber, the propagation speed of an optical signal transmitted in the optical wave guide varies depending on the wavelength. As the distance traveled by the light propagating in the optical wave guide is increased, wavelengths minutely different from one another increase the pulse width of the optical signal. Then interference occurs between the optical signals including the above different wavelengths.

The chirping parameter ($\alpha$p), which indicates the degree of chirping, can be expressed as the ratio between the change in the refractive index of an optical modulator and the change in the absorption coefficient of the optical modulator.

Thus the value of the chirping parameter (αp) can be set by adjusting the difference in energy between the wavelength of light emitted by the semiconductor laser device and the wavelength at the absorption edge of the optical modulator, as well as the value of electric field strength to drive the optical modulator. The difference in energy between the wavelength of light emitted by the semiconductor laser device and the wavelength at the absorption edge of the optical modulator can be controlled by the atmosphere temperature of the optical modulator. The temperature dependence of the absorption edge energy of an optical modulator formed by semiconductor material is equal to that of the band gap energy of the semiconductor material. On the other hand, the oscillation wavelength of a semiconductor laser device of the DFB type or the DBR type, which uses a normal diffraction grating, or a semiconductor laser device with a diffraction grating using an array wave guide is less temperature-dependent, as compared with the above optical modulator. For example, in the case of the DFB type laser, the temperature dependence of the oscillation wavelength is about 0.1 nm/deg., while the temperature dependence of the absorption edge energy of the optical modulator is about 0.7 to 0.8 nm/deg.

First Embodiment of the Present Invention

FIG. 1 is a perspective view showing an embodiment of a multiple wavelength transmitter according to the present invention. The figure shows the schematically constitutional view of an embodiment of a multiple wavelength transmitter. This embodiment incorporates an optical modulator operating in a 1.55 μm wavelength band.

The basic configuration of the optical transmitter is outlined as follows. An optical fiber 109 placed in a fiber sleeve 110 from one wall surface of a casing 101 is extended outside. A semiconductor optical device 106 is provided next to an optical isolator 108 and an optical lens 107, which are optically connected to the optical fiber 109. The semiconductor optical device 106 is mounted on a semiconductor optical device mounting substrate 105, and both of them are further mounted on the top of a temperature adjuster 102. A Peltier device, general description of which was made earlier, was used for the temperature adjuster 102. Incidentally, the configuration of the semiconductor optical device 106 itself will be described later in detail. If necessary, a monitoring photodetector 103 is provided on the opposite wall surface side of the casing 101 in such a way as to face the semiconductor optical device 106. Incidentally, desired electric input lines 104 are extended outside from the side walls of the casing 101. The casing 101, the temperature adjuster 102, the monitoring photodetector 103, the electric input lines 104, the optical lens 107, the optical isolator 108, the optical fiber 109, the fiber sleeve 110, and the like themselves are adequately provided by using previously known techniques.

Figure 2:
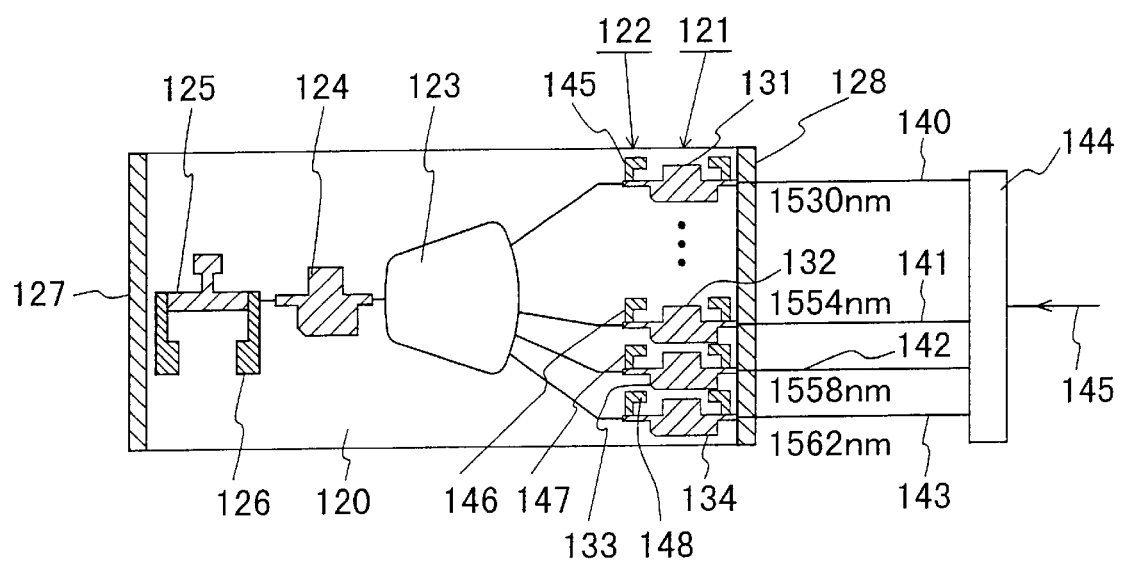
FIG. 2 is a plan arrangement view of a semiconductor optical device for multiple wavelength optical transmission according to the present invention.
Figure 3:
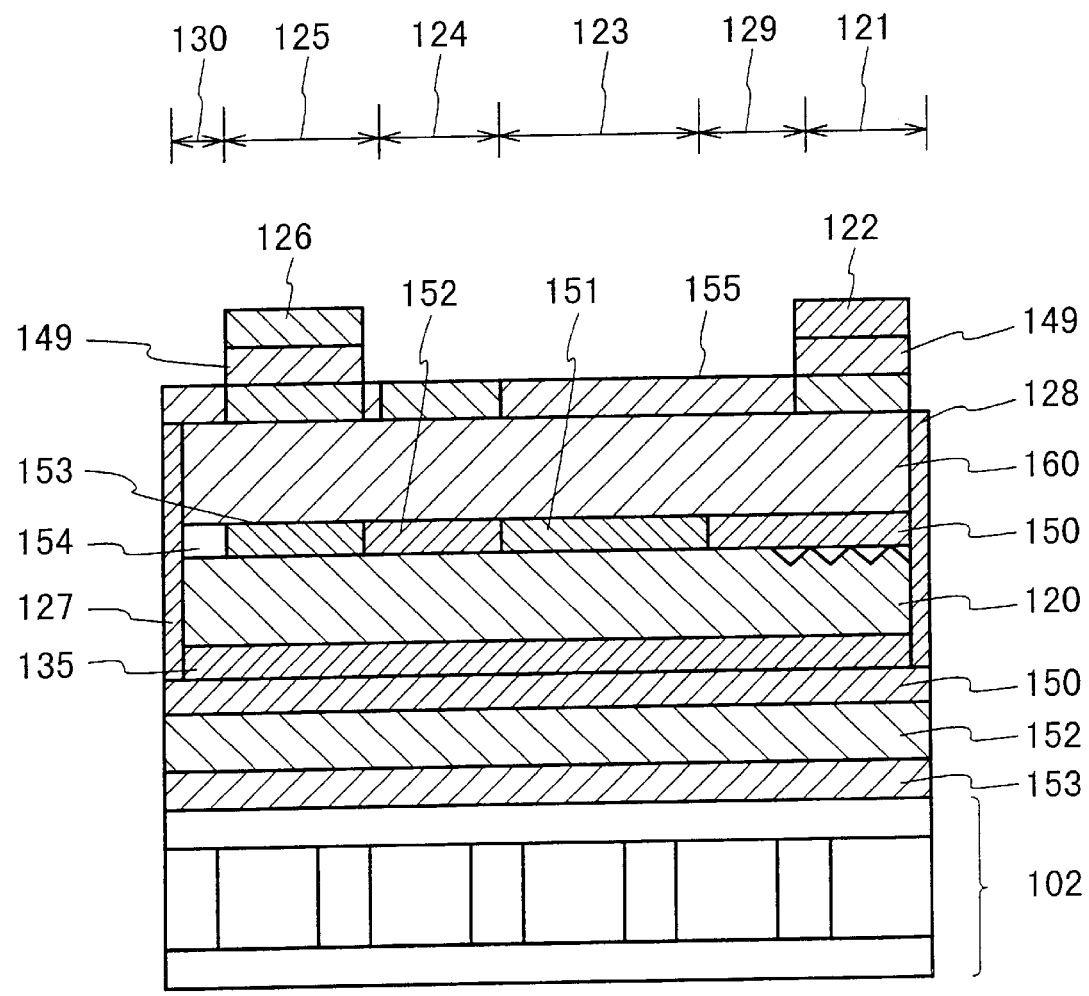
FIG. 3 is a sectional view of the semiconductor optical device shown in FIG. 2, taken along the optical wave guide of the semiconductor optical device.

FIG. 2 is a view showing the parts arrangement of the semiconductor optical device 106 viewed from the upper surface. FIG. 3 is a sectional view along the direction of the travelling light. Incidentally, FIG. 3 is presented along the optical wave guide, and is not an accurate sectional view of the apparatus shown in FIG. 2.

The semiconductor optical device 106 is formed by using an InP/InGaAsP material, InP/InGaAlAs material, or a combination of both. InP was used for a substrate 120 to form the semiconductor optical device 106.

For the semiconductor optical device 106 in this embodiment, a laser array 121 is placed on one side. The laser array 121 in this embodiment is a multiple wavelength distributed feedback laser array. The multiple wavelength distributed feedback laser array is a laser array in which distributed feedback laser devices are arranged in array and the wavelengths of the laser devices are set to be different from each other. As shown in FIG. 2, the multiple wavelength distributed feedback laser array 121 in this embodiment has a plurality of laser devices (131, 132, 133, 134) with light emission peaks in the proximity of 1530 nm to 1562 nm wavelength bands. The multiple wavelength distributed feedback laser array 121 in this embodiment has achieved oscillation wavelength control at intervals of 4 nm in a range from 1530 nm to 1562 nm by changing the period of the diffraction gratings. Laser devices of the distributed feedback type are most practical, but the laser devices do not necessarily need to be of the distributed feedback type. Of course, this is conditioned on the fact that the longitudinal mode of the laser oscillation is stable. In this respect, the laser devices can be configured by using DBR (Distributed Bragg Diffraction) type laser devices, for example. FIG. 2 shows a configuration in which a modulating signal 145 from the outside is selected by a switch 144 and goes through signal systems 140 to 143 to drive each of the semiconductor laser devices 131 to 134. Input to signal systems for each of heaters 122 is performed in a similar manner.

The light of each wavelength of the laser array 121 is multiplexed by an optical multiplexer 123. The optical multiplexer 123 is optically connected to an optical modulator 125 via an optical amplifier 124 by means of an optical wave guide. The optical modulator 125 in this embodiment is a commonly known electric field absorption type semiconductor optical modulator. After optically amplified by the optical amplifier 124, the light is inputted into the optical modulator 125. Furthermore, the end surface of the semiconductor optical device 106 on the optical modulator side is provided with a low-reflection film 127 having a reflectance of 0.02% or lower, while the end surface on the laser side is provided with a high-reflection film 128 having a reflectance of about 90%. The light is emitted from this low-reflection film 127 to the outside of the present optical semiconductor apparatus.

In this embodiment, temperature control means 122 and 126 (Incidentally, these numerals generically denote means.) are provided in the proximity of each of the laser devices of the laser array 121 and the optical modulator 125. In FIG. 2, the temperature control means 122 for each of the laser devices are individually shown as 145, 146, 147, and 148. The temperature control means 126, meanwhile, is a heater for controlling the operating temperature of the optical modulator 125.

FIG. 3 is a sectional view of this embodiment. An optical wave guide 150 using a compound semiconductor material such as InGaAsP or InGaAlAs is formed on the semiconductor substrate 120. In this embodiment, a diffraction grating 151 for a DFB type laser is preformed on the surface of the semiconductor substrate InP 120. The laser part 121, a wave guide part 129, the optical multiplexer part 123, the optical amplifier part 124, the optical modulator part 125 may be formed by using normal configurations and manufacturing methods. Optical wave guides 151, 152, and 153 correspond to the optical multiplexer part 123, the optical amplifier part 124, and the optical modulator part 125 respectively. An InP layer, which serves as a cladding layer 160 for an optical wave guide, is formed on the above wave guides.

Incidentally, an InP layer is provided on the light emission side to reduce light absorption as much as possible. Its structure is called a window structure 154. In other embodiments using different configurations from that of the present embodiment, it is advantageous in preventing reduction in optical output to employ this structure in practical use.

The electrodes 121 of the semiconductor laser part nd the optical modulator part, and heaters 122 and 126 are formed on the above-described layer, with a silicon dioxide film of an insulating layer 149 placed between the above layer and the heaters 122 and 126. The above electrodes are laminated films with three layers made of Ti, Pt, and Ti, respectively. For the heaters, Pt or Ti was used. Incidentally, an n-side electrode 135 is formed on the underside of the semiconductor substrate. A silicon nitride film was used for a passivation film 155 on the surface of the present apparatus.

The semiconductor optical apparatus thus prepared is, as in normal cases, mounted on a heat sink 150 and a chip carrier 152, and all of them are further mounted on a temperature adjuster 102. The temperature adjuster 102 is a normal Peltier element.

The temperature of each of the semiconductor laser devices can be controlled by passing a desired current through each of the heaters 122 for controlling the oscillation wavelength of the laser (Specifically, individual heaters are denote by numerals 131 to 134.). Then this temperature control allows the laser oscillation wavelength to vary by about 4.5 nm. As a result, so-called continuous wavelength sweeping in a range of 1530 nm to 1562 nm is made possible by using in combination the function of selecting the laser channel to be operated and the wavelength variable function. More specifically, a desired laser device in the semiconductor laser array can be selected, and minute variations in the oscillation wavelength of the laser device can be controlled at the above-mentioned intervals of 4 nm, for example. Therefore, wavelength settings specified for wavelength multiplexing optical communication systems as described above can be minutely adjusted.

When the present optical device is to be operated, current is passed through the heater 126 for controlling the operating temperature of the modulator, according to the wavelength $\lambda_p$ of inputted light. Specifically, this control method takes into account the amount of variation due to temperature (about 0.7 nm/deg) in the absorption edge wavelength of the electric field absorption type optical modulator 125, and adjusts the electric power applied to the temperature control means, or the heater in such a way that an about 10° C. temperature rise is caused for a 7 nm increase in the wavelength $\lambda_p$.

Figure 4:
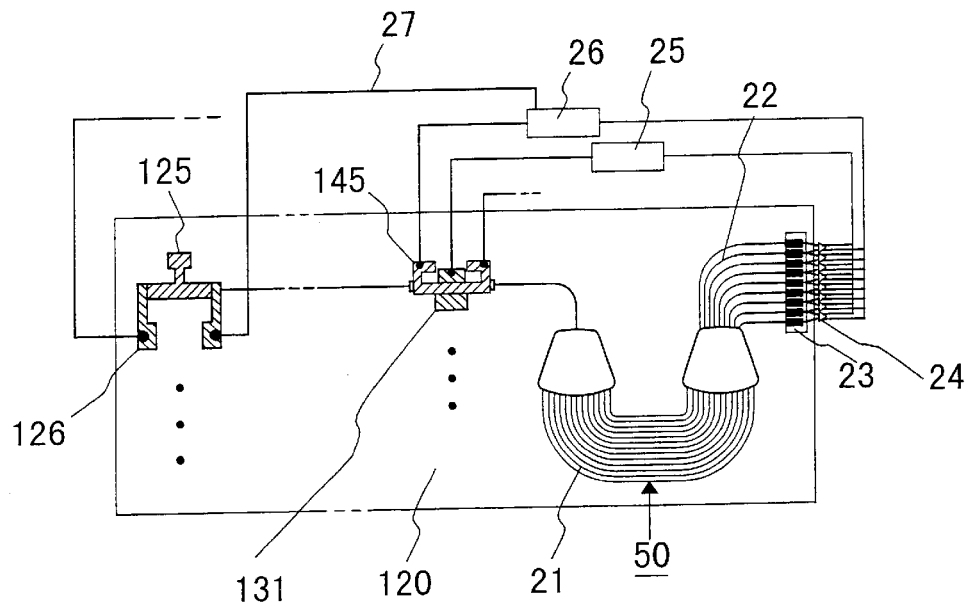
FIG. 4 illustrates a wavelength detector and a driving current control system of a semiconductor laser device.
Figure 5:
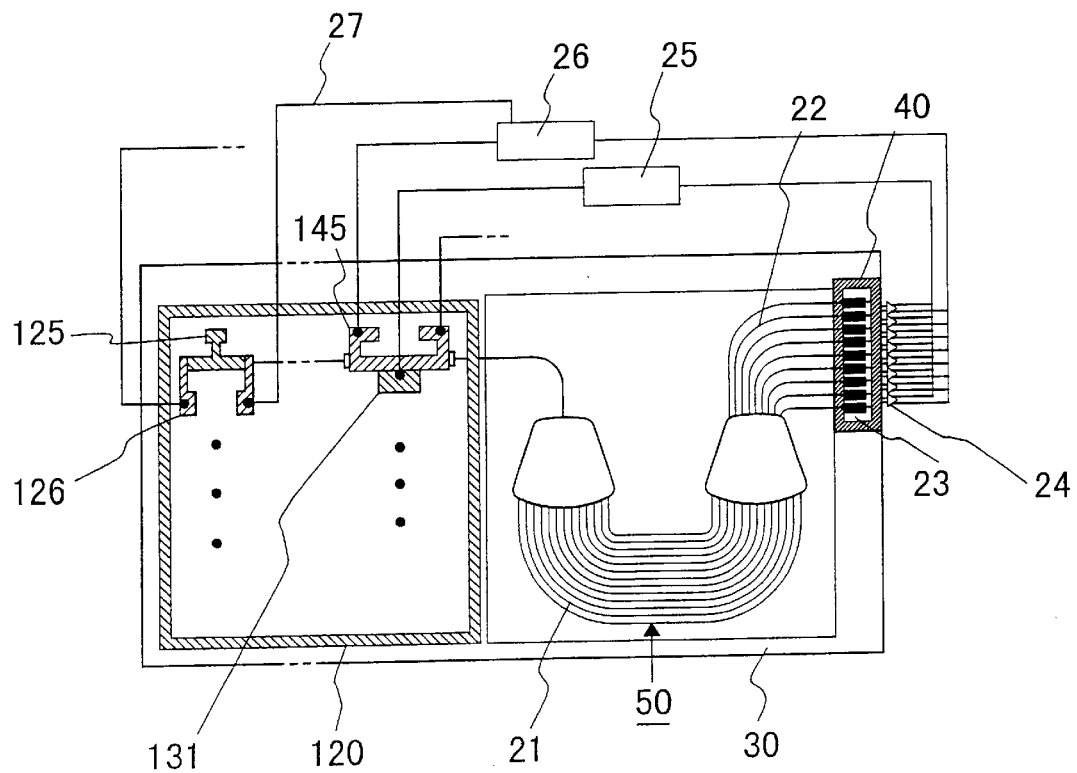
FIG. 5 illustrates another example of a wavelength detector and a driving current control system of a semiconductor laser device.
Figure 6:
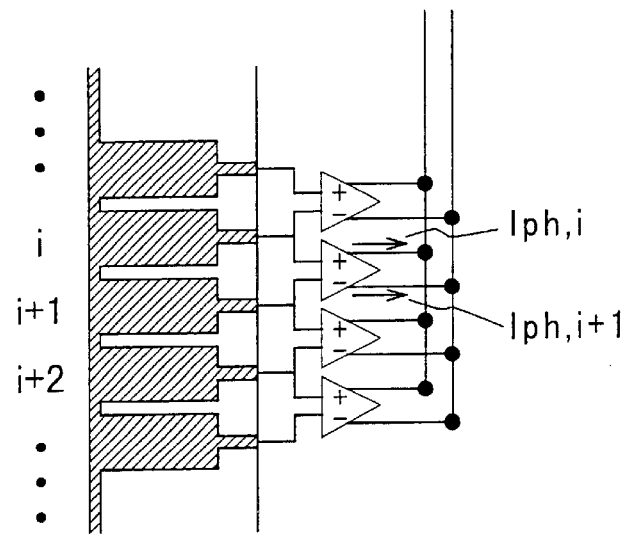
FIG. 6 illustrates a circuit of the wavelength detector and the driving current control system of the semiconductor laser device mentioned above.
Figure 7:
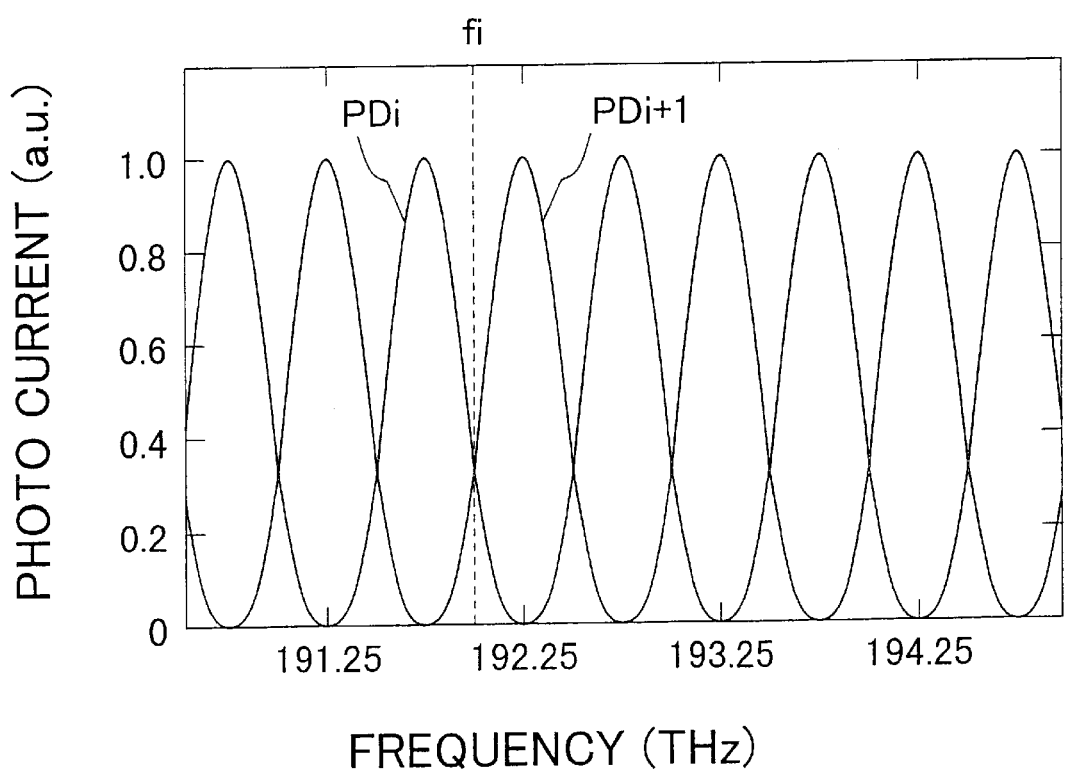
FIG. 7 shows an example of an optical signal from photodetectors of the control circuit shown in FIG. 6.
Figure 8:
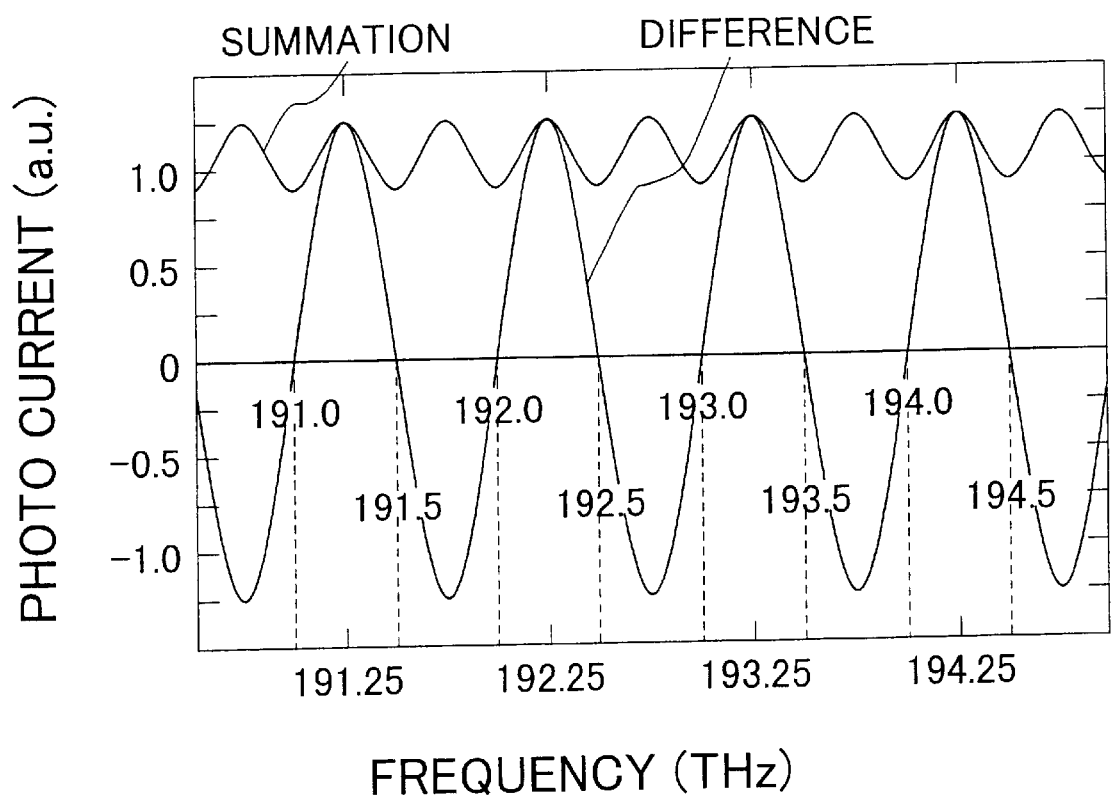
FIG. 8 shows an example of the output of the logic circuit in the control circuit shown in FIG. 6.

FIGS. 4 and 5 shows a control system according to the present invention for controlling the driving current value of a semiconductor laser device and the driving current value of the heater, based on the emission wavelength of the semiconductor laser device, as well as a control system according to the present invention for controlling the driving current value of the heater for the optical modulator. FIG. 4 shows an example in which the wavelength detector is monolithically integrated with the optical semiconductor apparatus according to the present invention. FIG. 5 shows an example in which the wavelength detector is integrated with the optical semiconductor apparatus according to the present invention in a hybrid manner. FIG. 6 shows a signal system for wavelength detection. FIGS. 7 and 8 shows examples of signal processing by the above control systems.

As shown in FIG. 4, a means 50 for detecting the wavelength of a semiconductor laser device is provided in addition. The laser wavelength detecting means 50 in this embodiment is formed by using an array wave guide diffraction grating 21. The array wave guide diffraction grating 21 separates and detects the light of each wavelength, which then goes through an optical wave guide 22, and is led to a signal processor 23. An example of the signal processor 23 and a logic circuit 24 is shown in FIG. 6.

The signal of the logic circuit 24 goes through the control system 25 for the driving current of a semiconductor laser device or the control system 26 for controlling the temperature of a semiconductor laser device, so that a specified signal is inputted into the electrode 131 of a semiconductor laser device or the heater 145 provided for a semiconductor laser device.

Similarly, in the case of controlling the heater of the optical modulator, the signal which has detected variations in the wavelength of the semiconductor laser device goes through the control system 27 for the heater of the optical modulator, so that a desired signal is inputted into the heater 126 of the optical modulator. Incidentally, numeral 125 in FIGS. 4 and 5 denotes the electrode of the optical modulator.

FIG. 5 shows an example in which an optical semiconductor apparatus 120 according to the present invention is integrated with a laser wavelength detecting means 50 in a hybrid manner. The basic operation and the like in this example are the same as those of the example in FIG. 4. Incidentally, if the temperature control of semiconductor laser devices is not required in these example, it may of course be omitted.

Light of a specific wavelength is separated for an ith photodetector 23 shown in FIG. 7 by the array wave guide diffraction grating 211 shown in FIG. 5. Specifically, as shown in FIG. 7, the photodetector i exhibits the maximum output for light of a 191.75 THz wavelength, while an adjacent photodetector i+1 exhibits the maximum output for light of a 192.25 THz wavelength. The output is converted into an output signal with a dependence on wavelengths as shown in FIG. 8 by going through an addition operation circuit or a subtraction operation circuit connected with the photodetector 23. The driving current value of the laser is controlled by means of the control system 25 for the driving of the semiconductor laser device by extracting information on the optical output of the laser mainly from the addition component. In addition, the driving current value of the heater is controlled by means of the temperature control system 25 for the laser device by extracting information on the light wavelength from the subtraction component. Furthermore, the temperature of the optical modulator according to the present invention is controlled by means of the heater 126 by using the above information extracted from the subtraction component. Numeral 27 in FIGS. 4 and 5 denotes this signal path.

Figure 9:
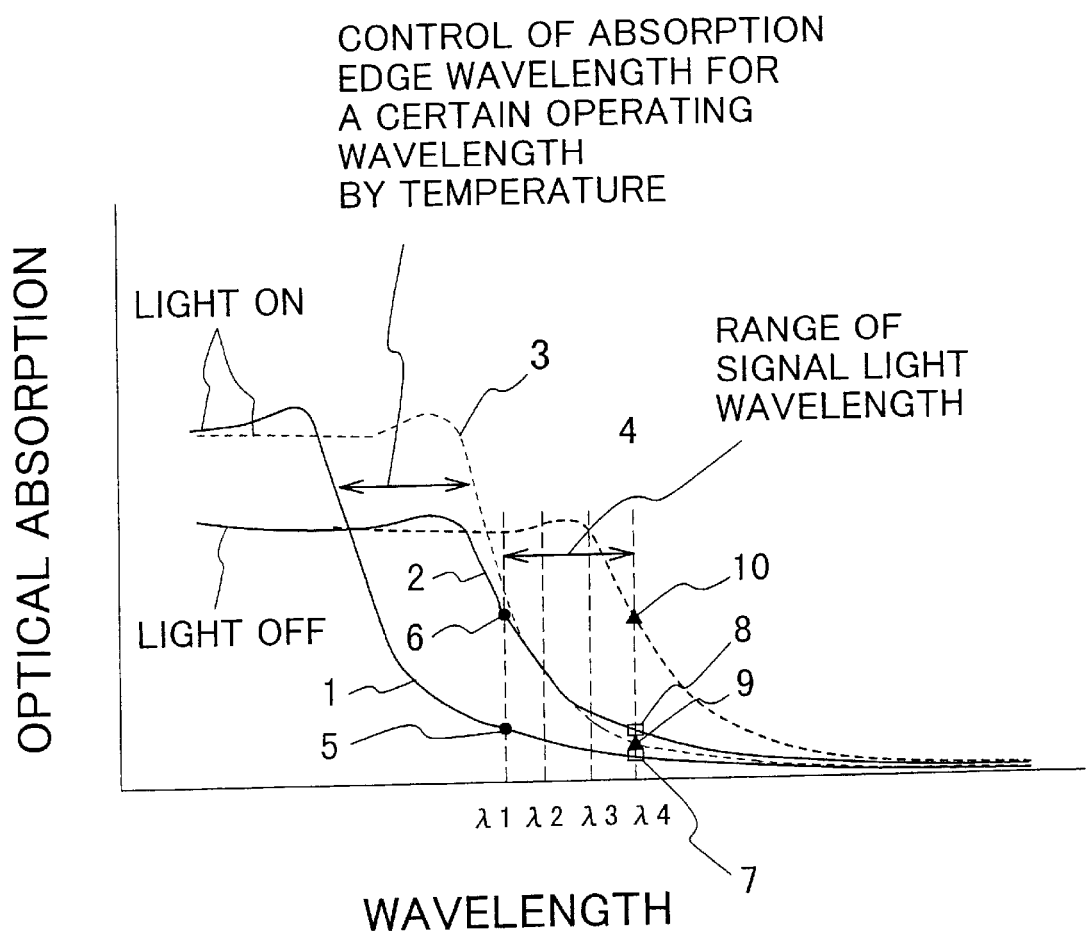
FIG. 9 shows the relation between a wavelength and an amount of optical absorption of an electric field absorption type optical modulator.

Next the basic concept of the present invention will be described. FIG. 9 shows the correlation between the absorption spectrum and the signal wavelength of the electric field absorption type optical modulator 125 when the operating temperature of the optical modulator is adjusted by a temperature control means. The characteristics of the wavelength and the amount of optical absorption when the light in the optical modulator 125 penetrates and when the light is intercepted are shown by using four curved lines. The light which penetrates is indicated by "light on", while the light which is intercepted is indicated by "light off". The range of variations in each of the four curved lines falls within the range of control by the above temperature control means. Specifically, in both cases of light on and light off, the above temperature control makes it possible to maintain either of the characteristics in the range in the above two curved lines.

In FIG. 9, four dotted lines in parallel with the axis of ordinates indicate changes in the oscillation wavelength of the laser device with λ1, λ2, λ3, and λ4. The four dotted lines represent the characteristics included in the range of changes in the light wavelength.

If variations in the characteristics of the optical modulator 125 are not adjusted, the following phenomenon occurs. Assume that the characteristics of the optical modulator 125 are indicated by curved line 1 in the case of light on and by curved line 2 in the case of light off, as shown in FIG. 9. As described earlier, in a wavelength multiplexing optical communication system, the transmission wavelength of each laser device, or the wavelength of each channel used in the system is determined. The characteristics of the optical modulator vary as the optical transmission distance is increased.

When signal light has a wavelength λ1, the amount of optical absorption is at point 5 in the case of light on in the optical modulator 125, and is at point 6 in the case of light off. In this case, the difference in the amount of optical absorption between light on and light off is maintained at a practical level. Suppose, however, that the light emmision wavelength of the semiconductor laser device has now changed to λ4. When the characteristics of the optical modulator 125 are as they were, the amount of optical absorption is at point 7 in the case of light on, and is at point 8 in the case of light off. In this case, the difference in the amount of optical absorption between light on and light off is not maintained at a practical level. According to the present invention, the characteristics of the optical modulator in this case are changed, according to the range of variations in the wavelength of the signal light, into the characteristics as indicated by curved line 3 in the case of light on, and into the characteristics as indicated by curved line 4 in the case of light off. In this case, the amount of optical absorption is at point 9 in the case of light on in the optical modulator 125 and is at point 10 in the case of light off. This state makes it possible to maintain the difference in the amount of optical absorption between light on and light off at a practical level. Thus the optical modulator can play its role sufficiently. Accoring to the present invention, these changes in the characteristics of the optical modulation are performed by using changes in the operating temperature.

In this embodiment, for any of the signal wavelengths, the difference between the signal wavelength and the absorption edge wavelength of the electric field absorption type optical modulator 125 (amount of detuning) can be adjusted within a range of 48 nm ±3 nm, as shown in FIG. 9. As a result, the chirping parameter which determines the fiber transmission characteristics of a transmitter can be controlled to within a range of 0.3±0.1 at all times.

The configuration above mentioned has made it possible to realize a transmitter that allows a wavelength multiplexing optical communication system to readily achieve higher transmission speed and longer transmission distance.

Incidentally, in this embodiment a temperature control means is provided even for a semiconductor laser device to adjust the wavelength; however, this means is not necessarily required. This embodiment can be realized even when the wavelength of laser oscillation is fixed. Furthermore, even when the wavelength of laser oscillation is fixed in a single laser device, an optical modulation means for achieving rapid optical modulation can be provided and the chirping characteristics of the optical modulator can be controlled as desired, by making the modulation characteristics of the optical modulator variable. These notes regarding the control of semiconductor laser devices can be applied to each of the embodiments described below.

Second Embodiment

Figure 10:
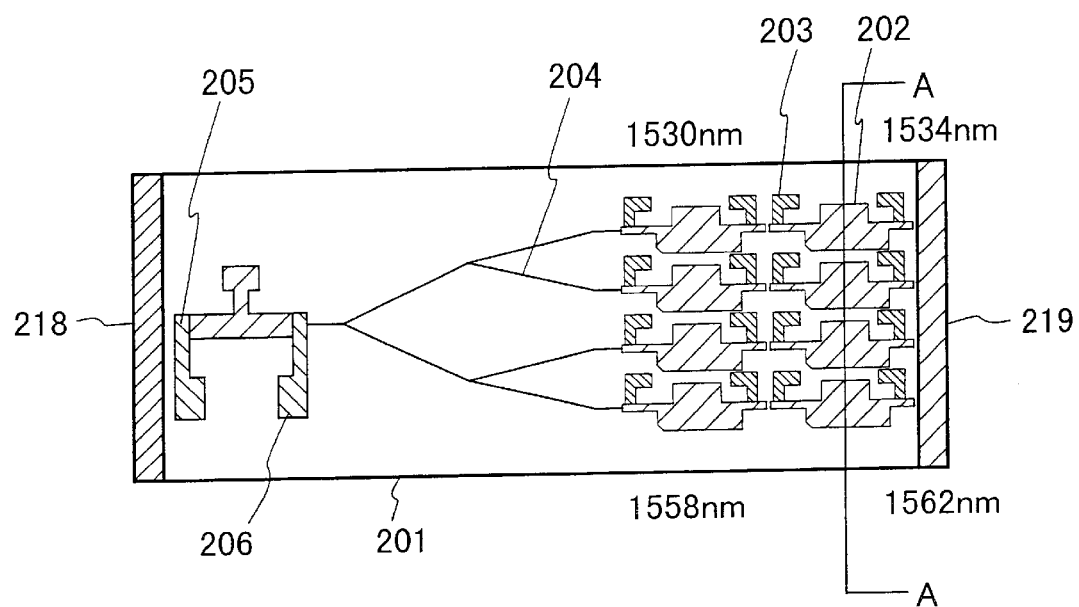
FIG. 10 is a plan arrangement view of a semiconductor optical device with wavelength variable type laser devices according to the present invention.
Figure 11:
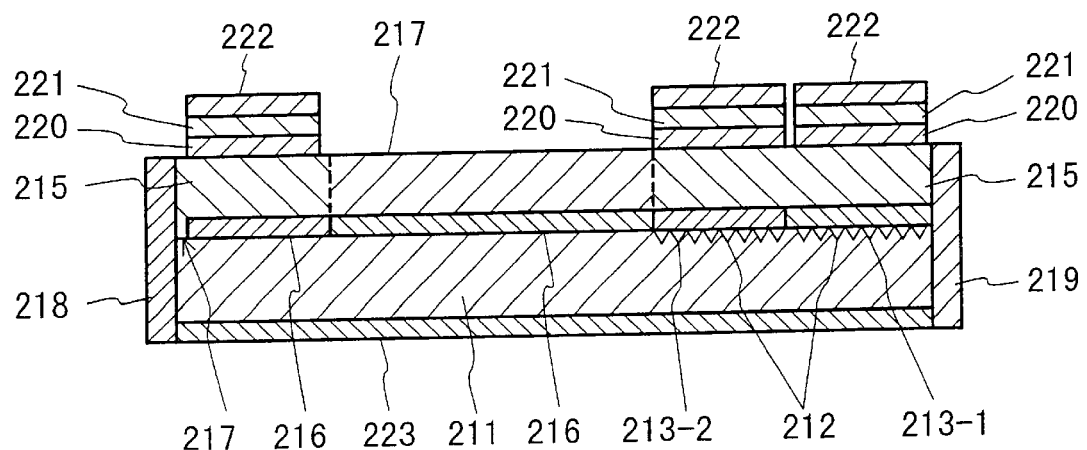
FIG. 11 is a sectional view of the semiconductor optical device shown in FIG. 10, taken along the optical wave guide.

In this embodiment, wavelength variable type laser devices are used as a wavelength multiplexing laser array according to the present invention. This embodiment is an example of a new transmitter with a built-in optical modulator operating in a 1.55 μm wavelength band. FIG. 10 is a plan view of a semiconductor optical device. FIG. 11 is a sectional view of the semiconductor optical device. The sectional view shows the schematically constitutional view of the components cross-sectioned along the optical path to facilitate understanding of the connection between each of the components and the optical wave guide or the like. Therefore, FIG. 11 is not an accurate sectional view.

FIG. 10 shows the basic configuration of the semiconductor optical device 201 of the second embodiment. Light from each laser device of a multiple wavelength distributed feedback laser array 202 is led to a optical multiplexer 204. In FIG. 10, the plurality of laser devices and temperature control means for the plurality of laser devices are represented by single numerals 202 and 203, respectively. The output of the optical multiplexer 204 is inputted into an electric field absorption type optical modulator 205. Moreover, in this embodiment, a means 203 for controlling the oscillation wavelength of a laser, or more specifically a heater is provided for each of the laser devices of the multiple wavelength distributed feedback laser array 202, and a heater 206 for controlling the operating temperature of a modulator is provided for the optical modulator 205.

The multiple wavelength distributed feedback laser array 202 has an active layer with a multi-quantum well structure formed by an InGaAsP material or an InGaAlAs material. The multiple wavelength distributed feedback laser array 202 has a plurality of laser active layer regions with light emission peaks in the proximity of 1530 nm to 1562 nm wavelength bands. The laser unit itself is adequately formed by using a normal configuration. As described earlier, a heater 122 for controlling the oscillation wavelength of a laser is provided for each of the laser devices. The laser device is configured in such a way that the laser oscillation wavelength can be made variable by 4.5 nm by passing a current through the heater and controlling the temperature of each laser device.

In this array configuration of the present embodiment, laser devices are arranged in two columns in the vertical direction and in four rows in the lateral direction. That is, a total of eight semiconductor laser devices are provided in this embodiment. A desired oscillation wavelength can be obtained by selecting one of the plurality of laser devices. In this case, when a laser in the back column is driven, a current is passed through the laser device in the front column at less than the threshold value to make the wave guide of the front-column laser device transparent to the oscillation light in the back column. This method of making semiconductor material transparent is commonly known. In addition, the number of laser devices is not limited to eight, the number taken in this embodiment, but may be changed as the design requires.

The method of producing the semiconductor optical device 201 is as follows. First, diffraction gratings 212 for distributed feedback lasers with different periods are formed on a (100) surface orientation n-type InP substrate 211 by using a normal electron beam exposure method or semiconductor etching technology. Oscillation wavelength control at intervals of 4 nm in a range of 1530 nm to 1562 nm is realized by changing the periods of the diffraction gratings. Next, a laser active layer 213, an optical modulator absorption layer 214, and a p-type InP cladding layer 215 are formed by using a commonly known organic metal vapor-phase growth method. These layers are formed by using InGaAsP or InGaAlAs. The emission wavelength of the laser active layer regions 213 (such as 213-1, 213-2, and others not shown in the figure) for the above-mentioned eight laser devices is set to be in the proximity of 1530 nm to 1562 nm wavelength bands by using a commonly known selective growth method. In addition, the emission wavelength of the absorption layer 214 of the optical modulator is set to be about 1482 nm.

Next, a cladding layer 215 is formed on the top of each of the laser device regions. This layer is p-type InP, and the wavelength of the layer is set to be 1.50 μm. An InP layer with a window structure 217 is provided on the light emission side to reduce light absorption as much as possible. Next, specified sections of the already formed semiconductor layers 213 and 215 are etched selectively to connect a wave guide core layer 216 and a cladding layer 217, which comprise the optical multiplexer 204, by using a butt joint method. The wave guide core layer 216 is made of InGaAsP, and has a wavelength composition of 1.05 μm to 1.10 μm. The cladding layer 217 is made of undoped InP.

Figure 12:
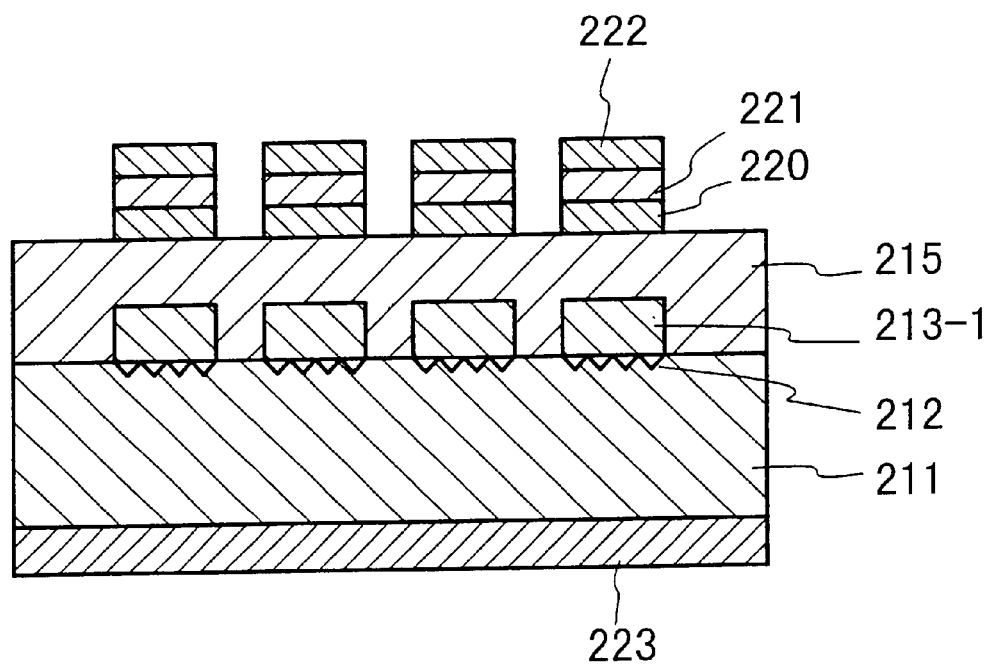
FIG. 12 is a sectional view of the semiconductor optical device shown in FIG. 10, taken in the direction perpendicular to an optical axis of the semiconductor optical device.

For the wave guide core layer 216, InGaAsP with a composition wavelength of 1.05 μm and a thickness of 0.3 μm was used. Next, electrodes are formed after a ridge wave guide is formed for each of the semiconductor laser devices. The ridge wave guide can be formed by normal methods. FIG. 12 is a cross section perpendicular to the optical axis showing the apparatus of this embodiment, and is an AA cross section of FIG. 10. Incidentally, it is also useful in other embodiments to use such a ridge wave guide in order to control the transversal mode of laser oscillation.

A low-reflection film;218 with a reflectance of 0.02% or less is provided on the end surface of the device on the optical modulator side, while a high-reflection film 219 with a reflectance of about 90% is provided on the end surface on the laser side. Next, electrodes 220 are formed for each of the semiconductor laser devices and the optical modulator. The electrodes 220 are p-type electrodes, and are normal laminated electrodes with three layers made of Ti, Pt, and Au. In the heater sections, insulating films 221 are formed on the electrodes 220 by using silicon dioxide, and the heaters are formed by using Platinum (Pt) or titanium (Ti). The silicon dioxide films generally have a thickness of about 200 nm to 300 nm. A lower electrode 223 is formed on the underside of the semiconductor substrate 221.

Incidentally, the means for monitoring the oscillation wavelength of a laser, the means for controlling the oscillation wavelength of the laser based on the monitoring, and the means for controlling the modulation characteristics of the optical modulator are the same as those described in the section on the previous embodiment. Therefore detailed description of these means will be omitted.

The configuration described above makes it possible to perform continuous wavelength sweeping in a range of 1530 nm to 1562 nm by using in combination the function of selecting the laser channel to be operated in the multiple wavelength distributed feedback laser array in this embodiment, and the wavelength variable function. When the device is to be operated, current is passed through the heater 205 for controlling the operating temperature of the modulator, according to the wavelength $\lambda_p$ of signal light. Specifically, this control method takes into account the amount of variation due to temperature (about 0.7 nm/deg) in the absorption edge wavelength of the electric field absorption type optical modulator 214, and adjusts the electric power applied to the heater in such a way that an about 10° C. temperature rise is caused for a 7 nm increase in the wavelength $\lambda_p$. The above-mentioned configuration of the optical transmitter makes it possible to adjust the difference between the signal wavelength and the absorption edge wavelength of the electric field absorption type optical modulator 214 (amount of detuning) within a range of 48 nm ±3 nm, as in the first embodiment. As a result, the chirping parameter which determines the fiber transmission characteristics of a transmitter can be controlled to within a range of 0.3±0.1 at all times.

The configuration above described has made it possible to realize a transmitter that allows a wavelength multiplexing optical communication system to readily achieve higher transmission speed and longer transmission distance.

Third Embodiment

Figure 13:
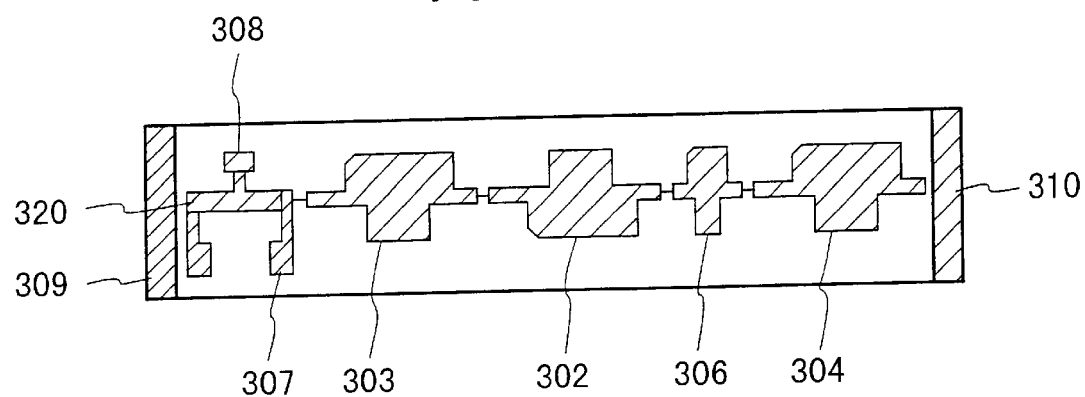
FIG. 13 is a plan arrangement view of another example of a semiconductor optical device according to the present invention.
Figure 14:
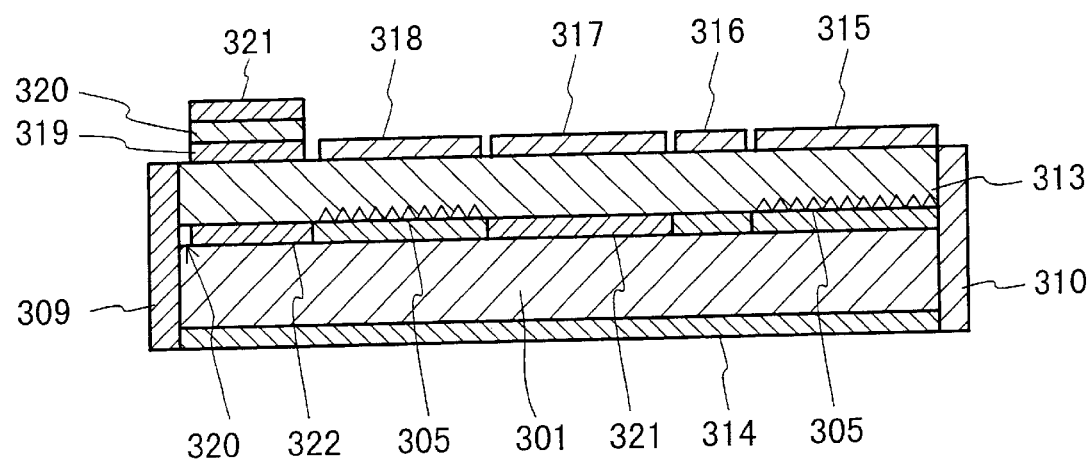
FIG. 14 is a sectional view of the semiconductor optical device shown in FIG. 13, taken along the optical wave guide.

This embodiment is an example of a semiconductor optical device with a DBR (Distributed Bragg Reflection) type laser. FIG. 13 is a plan view of an example of a new transmitter with a built-in optical modulator according to the present invention. FIG. 14 is a sectional view of the transmitter. The apparatus in this embodiment operates in a 1.55 μm wavelength band.

In the semiconductor optical device of the present embodiment, a first distributed reflector 304 region, a phase adjustment layer 306 region, an active layer region 302 for laser oscillation, a second distributed reflector 303 region, and an optical modulator 308 region are optically connected to each other. Also, in this embodiment, a temperature control means 307 is provided for the optical modulator 308. A specific example of the temperature control means 307 is a heater. Low-reflection planes 309 and 310 are formed on both end surfaces of the semiconductor optical device containing the above optical means.

Each laminated layer comprising the optical semiconductor apparatus of the present embodiment is about the same as that of a semiconductor laser device or an optical modulator with a normal ridge type embedded structure. FIG. 14 is a sectional view in parallel with the optical axis showing the optical semiconductor apparatus. There is formed on the top of an InP substrate 301 a optical wave guide 305 with multi-quantum well structure, which is made of an InGaAsP material or an InGaAlAs material, and corresponds to a specified oscillation wavelength. The optical wave guide 305 is made of InGaAsP and has a wavelength composition of 1.55 μm. A specified region of the optical wave guide 305 is removed by selective etching, and crystal growth is performed in this region to form an optical wave guide 321 made of InGaAsP with a wavelength composition of 1.3 μm. Next a diffraction grating 305 is formed on the upper surface of the optical wave guide. Then a cladding layer 313 is formed in such a way as to cover these layers. The cladding layer 313 is p-type InP. Moreover, a light emission part 320 has a window structure, which is formed during the selective growth of InP.

An n-type electrode 309 is formed on the back side of the semiconductor substrate 301, and electrodes 315, 316, 317, 318, and 319 are formed for each of the optical means, from the semiconductor laser device to the optical modulator. Each of the electrodes is a normal p-type laminated electrode with three layers made of Ti, Pt, and Au. In the heater section, an insulating film 320 is formed on the electrode 319 by using silicon dioxide, and a heater 321 is formed by using Platinum (Pt) or titanium (Ti). Furthermore, the end surface of the semiconductor optical device on the optical modulator side is provided with a low-reflection film 309 having a reflectance of 0.02% or lower, while the end surface on the laser side is provided with a high-reflection film 310 having a reflectance of about 90%.

Incidentally, the means for monitoring the oscillation wavelength of a laser, the means for controlling the oscillation wavelength of the laser based on the monitoring, and the means for controlling the modulation characteristics of the optical modulator are the same as those described in the section on the previous embodiment. Therefore detailed description of these means will be omitted.

Similarly, the methods of producing the semiconductor optical device including the laser active region 302, the long period super lattice structure distributed reflector 305, the electric field absorption type optical modulator 308, the heater 307 for controlling the operating temperature of the modulator, and the like are the same as those described in the second embodiment.

The configuration of the distributed reflection type laser using the long period super lattice structure diffraction grating mentioned above has made it possible to realize a wavelength variable range of 30 nm or more by using a commonly known control method. More specifically, the configuration described above makes it possible to perform continuous wavelength sweeping in a range of 1530 nm to 1562 nm. When the device is to be operated, current is passed through the heater 307 for controlling the operating temperature of the modulator, according to the wavelength $\lambda_p$ of signal light. Specifically, this control method takes into account the amount of variation due to temperature (about 0.7 nm/deg) in the absorption edge wavelength of the electric field absorption type optical modulator 308, and adjusts the electric power applied to the heater in such a way that an about 10° C. temperature rise is caused for a 7 nm increase in the wavelength $\lambda_p$. The above-mentioned configuration of the optical transmitter makes it possible to adjust the difference between the signal wavelength and the absorption edge wavelength of the electric field absorption type optical modulator 308 (amount of detuning) within a range of 48 nm ±3 nm, as in the first embodiment. As a result, the chirping parameter which determines the fiber transmission characteristics of a transmitter can be controlled to within a range of 0.3±0.1 at all times. Thus, higher transmission speed and longer transmission distance of a wavelength multiplexing optical communication system can be readily achieved.

The configuration described above has made it possible to realize a transmitter that allows a wavelength multiplexing optical communication system to readily achieve higher transmission speed and longer transmission distance.

Fourth Embodiment

Figure 15:
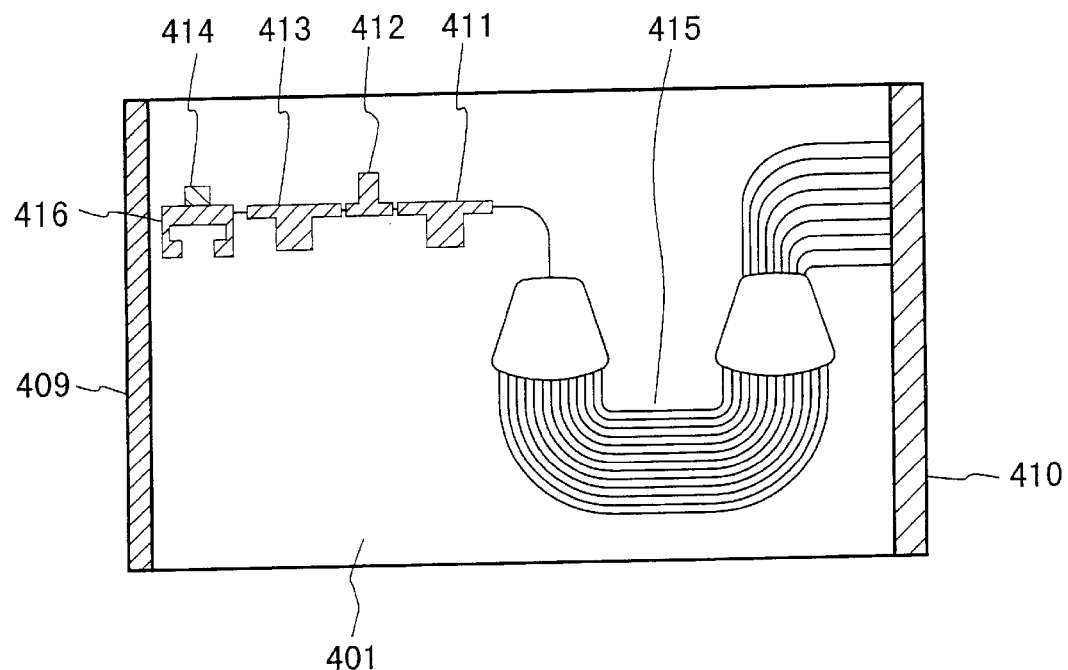
FIG. 15 is a plan arrangement view of a semiconductor optical device with an array wave guide diffraction grating according to the present invention.
Figure 16:
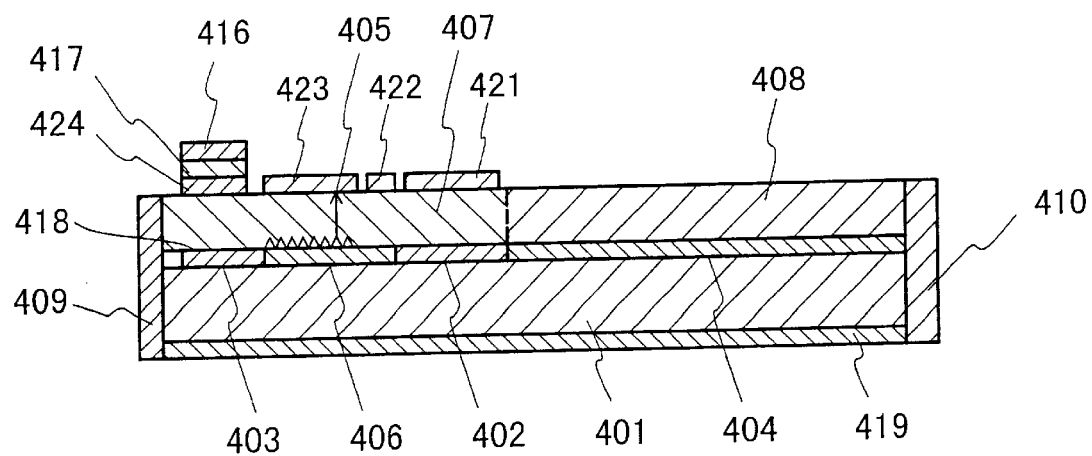
FIG. 16 is a sectional view of the semiconductor optical device shown in FIG. 15, taken along the optical wave guide.

This embodiment is an example including a compound resonator type laser using an array wave guide diffraction grating. FIG. 15 shows a new transmitter with a built-in optical modulator operating in a 1.55 μm wavelength band, which is produced according to the present invention. FIG. 15 is a plan arrangement view of the semiconductor optical device with a compound resonator type laser using an array wave guide diffraction grating. FIG. 16 is a sectional view of the semiconductor optical device. Incidentally, the sectional view shows the schematically constitutional view of the components cross-sectioned along the optical path to facilitate understanding of the connection between each of the components and the optical wave guide or the like. Therefore, FIG. 16 is not an accurate sectional view.

The laser resonator of the semiconductor optical device comprises a laser active region 411, a distributed reflector 413, a phase adjuster 412, and an array wave guide diffraction grating 415. The array wave guide diffraction grating 415 has a total of 20 channels at channel intervals of 50 GHz. A heater 414 for controlling the operating temperature of a modulator is formed in the section of an electric field absorption type optical modulator 403. Incidentally, the array wave guide diffraction grating itself is adequately formed by using a commonly known configuration. There are formed on the InP of a semiconductor substrate 401 optical wave guides 402 and 403 with a wavelength composition of 1.55 μm and with a wavelength composition of 1.50 μm, respectively. A multi-quantum well structure is used for the laser active layer region. Next, specified regions of the optical wave guides are removed by selective etching, and optical wave guides 404 and 406 with wavelength compositions of 1.10 μm to 1.05 μm are selectively grown in the regions. The region 404 corresponds to the array wave guide diffraction grating 415 region; the region 402 corresponds to the laser active layer region; the region 406 corresponds to the phase adjuster region; and the region 403 corresponds to the absorption layer region of the optical modulator. A diffraction grating 405 is formed on the top of the above optical wave guide 403 comprising a semiconductor. The diffraction grating 405 comprises the distributed reflector of the present laser unit. Then an undoped InP layer 408, which serves as a cladding layer, is formed on each of these layers. Incidentally, a light emission part 418 has a window structure, which is formed during the selective growth of the above-mentioned InP.

An n-type electrode 419 is formed on the underside of the semiconductor substrate 401, and then electrodes 421, 422, 423, and 424 are formed for each of the optical means, from the semiconductor laser device to the optical modulator. Each of the electrodes is a normal p-type laminated electrode with three layers made of Ti, Pt, and Au. An insulating film 417 is formed on the electrode 414 by using silicon dioxide, and a heater 416 is formed by using platinum (Pt) or titanium (Ti). The end surface of the semiconductor optical device on the optical modulator side is provided with a low-reflection film 409 having a reflectance of 0.02% or lower, while the end surface on the laser side is provided with a high-reflection film 410 having a reflectance of about 90%.

Incidentally, the means for monitoring the oscillation wavelength of a laser, the means for controlling the oscillation wavelength of the laser based on the monitoring, and the means for controlling the modulation characteristics of the optical modulator, which are provided in practical use, are the same as those described in the section on the previous embodiment. Therefore detailed description of these means will be omitted.

The methods of producing each part of the semiconductor optical device described above are the same as those described in the second embodiment. Therefore, detail description of the methods will be omitted.

The principles of the laser oscillation operation are as follows. The distributed reflector 405 and the array wave guide diffraction grating 415 play the role of the reflector of the laser. The reflection band of the distributed reflector 405 is set to be wide, with a half-width of about 2 nm, while the reflection band of the array wave guide diffraction grating 415 is set to be narrow, with a half-width of 0.2 nm. As a result, the oscillation wavelength of the laser is mainly determined by the array wave guide diffraction grating 415. The oscillation wavelength of the laser can be made variable by passing a current through the distributed reflector 413 from the electrode 413 of the distributed reflector. In this case, the phase of the laser resonator mode is adjusted by passing a current through the phase adjuster 406 from the phase adjuster electrode 412. This configuration allows the oscillation wavelength of the laser to be made variable in a discrete manner in a range of about 8 nm at intervals of 50 GHz.

The configuration of the compound resonator type laser mentioned above has made it possible to realize a wavelength variable range of about 8 nm. More specifically, the configuration described above makes it possible to perform continuous wavelength sweeping in a range of 1550 nm to 1558 nm. When the device is to be operated, current is passed through the heater 414 for controlling the operating temperature of the modulator, according to the wavelength $\lambda_p$ of signal light. Specifically, this control method takes into account the amount of variation due to temperature (about 0.7 nm/deg) in the absorption edge wavelength of the electric field absorption type optical modulator 403, and adjusts the electric power applied to the heater in such a way that an about 10° C. temperature rise is caused for a 7 nm increase in the wavelength $\lambda_p$.

The above-mentioned configuration of the optical transmitter makes it possible to adjust the difference between the signal wavelength and the absorption edge wavelength of the electric field absorption type optical modulator 403 (amount of detuning) within a range of 48 nm ±3 nm, as in the first embodiment. As a result, the chirping parameter which determines the fiber transmission characteristics of a transmitter can be controlled to within a range of 0.3±0.1 at all times. Thus, higher transmission speed and longer transmission distance of a wavelength multiplexing optical communication system can be readily achieved.

The configuration described above has made it possible to realize a transmitter that allows a wavelength multiplexing optical communication system to readily achieve higher transmission speed and longer transmission distance.

Fifth Embodiment

Figure 17:
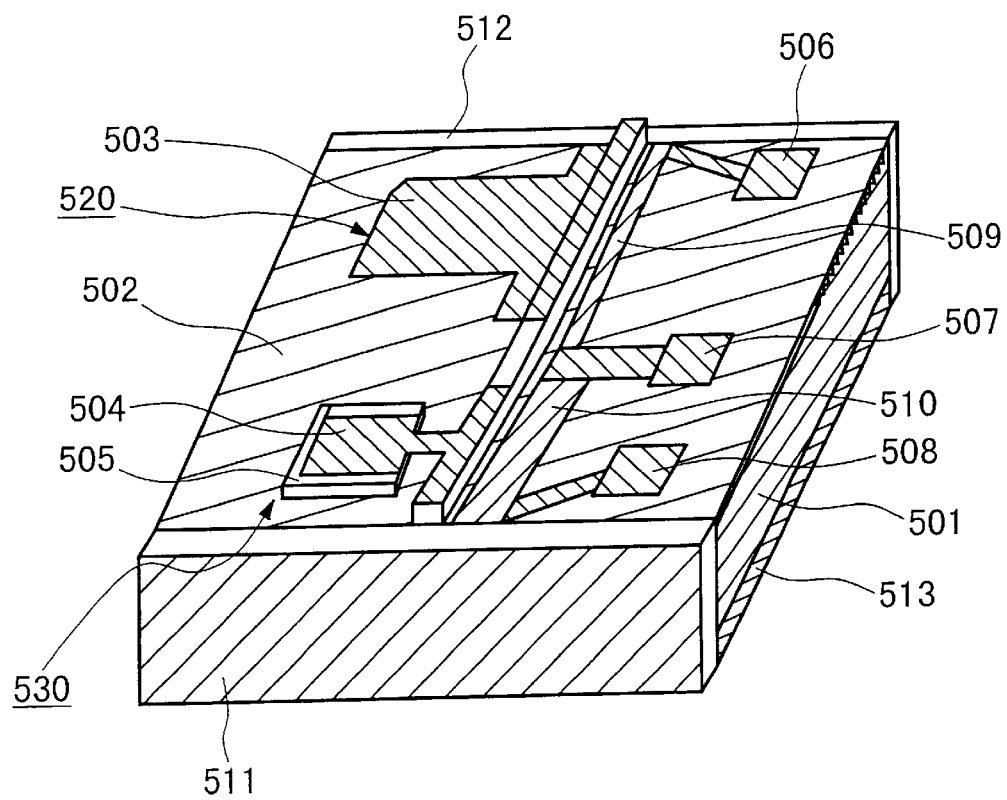
FIG. 17 is a perspective view of a semiconductor optical device with an electric field absorption type optical modulator according to the present invention.

FIG. 17 shows a new transmitter with a built-in optical modulator operating in a 1.55 μm wavelength band, which is produced according to the present invention. FIG. 17 shows an example of the configuration of an optical modulator which is monolithically integrated with a heater-loaded and wavelength variable type distributed feedback laser device.

Figure 18A:
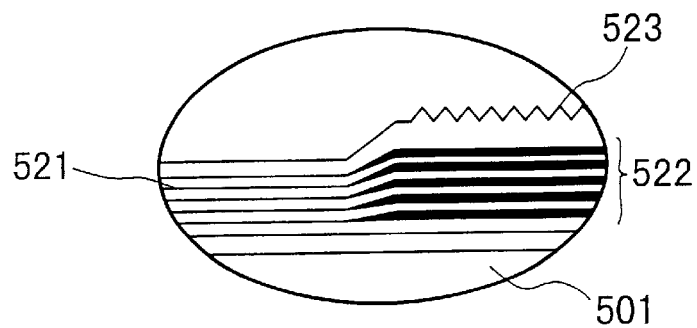
FIGS. 18(a), 18(b) and 18(c) are sectional views of optical wave guides applicable to the semiconductor optical device shown in FIG. 17.
Figure 18B:
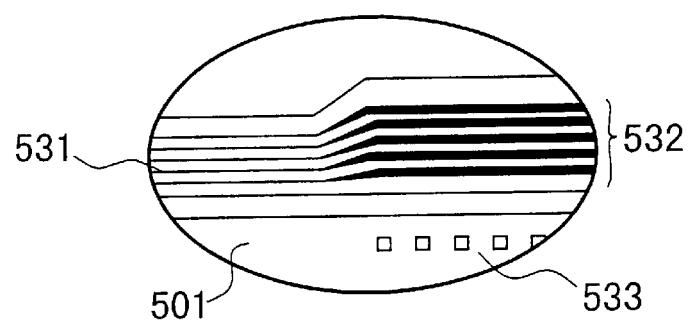
Figure 18C:
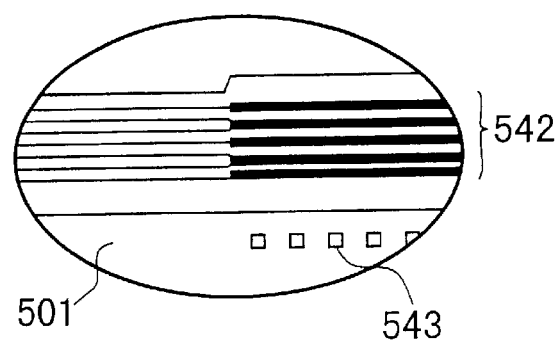

There is mounted on an n-type InP substrate 501 an optical wave guide used for a laser device 520 and an electric field absorption type optical modulator 530. Several configurations can be conceived for this optical wave guide, as shown in FIGS. 18(a) to 18(c). FIGS. 18(a) to (c) illustrate three configurations described as follows. Incidentally, the figures show only the essential parts of the optical wave guide schematically. FIG. 18(a) shows an example of two InGaAsP multi-quantum well structures 521 and 522 with different film thicknesses formed by using a commonly known region selective growth method. The configurations shown in FIGS. 18(a) and 18(b) are formed by a so-called region selective growth method in which differences in film thickness occurs during crytal growth according to the width of selective growth. The configuration shown in FIG. 18(c) is formed by using a different process. In the configuration shown in FIG. 18(a), a diffraction grating 523 is formed on top of a multi-quantum well structure 522. FIG. 18(b) shows an example of InGaAlAs multi-quantum well structures 531 and 532 formed by using a commonly known region selective growth method. FIG. 18(c) shows a configuration in which an optical modulator with an InGaAsP multi-quantum well structure 541 and an InGaAlAs multi-quantum well structure 542 are connected to each other by using a commonly known butt joint method. In each of the configurations shown in FIG. 18(b) and 18(c), a multi-quantum well structure is formed on the top of the base for crystal growth where a diffraction grating 532 or 543 is formed. In the present invention, any one of the configurations may of course be used.

As shown in FIG. 17, one of the above basic wave guide configurations being provided, a laser electrode 503 and an optical modulator electrode 505 are mounted. Also in this embodiment, a heater 509 for controlling the wavelength of the laser and a heater 510 for adjusting the operating temperature of a modulator are formed beside the laser electrode 503 and the optical modulator electrode 505, respectively. The resistance value of the heater 509 for controlling the wavelength of the laser is 20 Ω to 100 Ω, and the resistance value of the heater 510 for adjusting the operating temperature of a modulator is set to be ½ to ⅛ of the resistance value of the heater 509 for controlling the wavelength of the laser by adjusting the electrode length and the electrode width. The same heater materials as those described earlier may be be used in this embodiment. Incidentally, the basic methods of producing the semiconductor optical device are the same as those described in the second embodiment, and therefore detailed description of the production methods will be omitted. Numeral 502 denotes a passivation film; numeral 511 denotes a low-reflection film; numeral 512 denotes a high-reflection film; and numeral 513 denotes a lower electrode.

In this embodiment, a wavelength variable range of about 6 nm has been realized by using a commonly known control method. More specifically, continuous wavelength sweeping in a range of 1550 nm to 1556 nm is possible. When wavelength sweeping is to be performed, current is passed through the wavelength controlling heater 509 and the heater 510 for controlling the operating temperature of the modulator in series. As described above, the resistance value of the laser wavelength controlling heater 509 is 7 to 8 times as high as that of the heater 510 for controlling the operating temperature of the modulator. Therefore, joule heat generated in the laser wavelength controlling heater 509 is also about 7 to 8 times as much as that of the heater 510 for controlling the operating temperature of the modulator.

There is a large difference between the amount of variation due to temperature in the laser oscillation wavelength (about 0.1 nm/deg) and the amount of variation due to temperature in the absorption edge wavelength of the electric field absorption type optical modulator 530 (about 0.7 nm/deg). However, the configuration in the present embodiment makes it possible to automatically correct the large difference in temperature coefficient.

As shown in this embodiment, the heater for the semiconductor laser device and the heater for the optical modulator are controlled independently of each other. However, in a concrete configuration, the heater for the semiconductor laser device and the heater for the optical modulator can be connected in series while each of the heaters adjust the heat generation independently.

This configuration is not limited to this embodiment, and can also be generally used in other embodiments of the present invention.

The above-mentioned configuration of the optical transmitter makes it possible to adjust the difference between the signal wavelength and the absorption edge wavelength of the electric field absorption type optical modulator 530 (amount of detuning) within a range of 48 nm ±3 nm, as in the first embodiment. As a result, the chirping parameter which determines the fiber transmission characteristics of a transmitter can be controlled to within a range of 0.3±0.1 at all times. Thus, higher transmission speed and longer transmission distance of a wavelength multiplexing optical communication system can be readily achieved.

The configuration described above has made it possible to realize a transmitter that allows a wavelength multiplexing optical communication system to readily achieve higher transmission speed and longer transmission distance.

Sixth Embodiment

This embodiment is intended to provide better transmission characteristics, and particularly better long-distance transmission characteristics by controlling a chirping parameter.

A transmission light source with a variable chirping parameter can be realized by using a monolithic integrated device with a heater-loaded type optical modulator and a distributed feedback laser device as described in the fifth embodiment.

Figure 19:
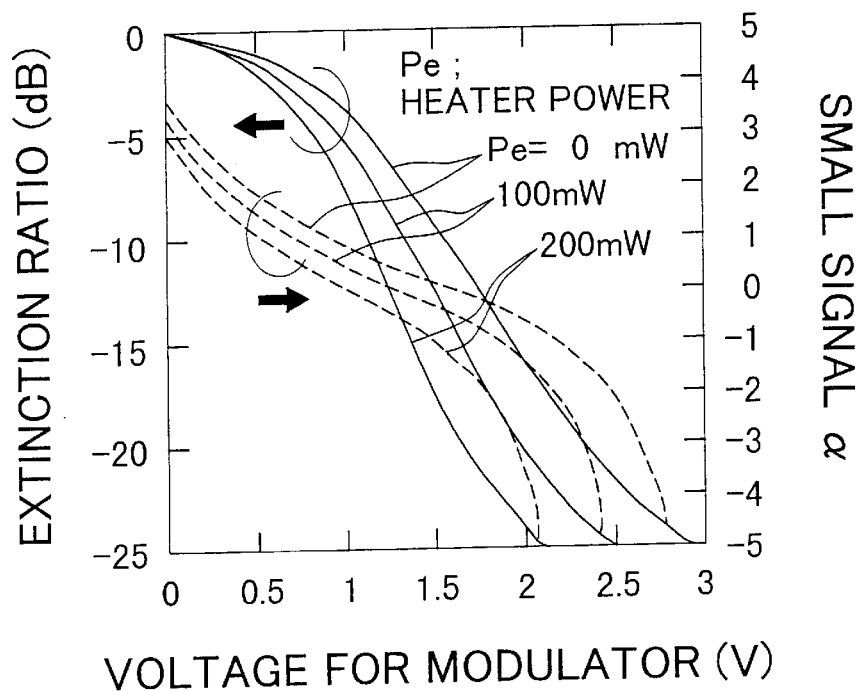
FIG. 19 shows the relation between a voltage applied to an optical modulator according to the present invention and the extinction ratio, and the relation between the voltage applied to the optical modulator and a small signal chirping parameter.

FIG. 19 shows the results obtained when a device with a configuration shown in FIG. 17 is used and the chirping parameter is changed by passing a current only through the heater 510 for adjusting the operating temperature of the modulator without using the wavelength controlling heater 509. The axis of abscissas in FIG. 19 indicates the voltage applied to the optical modulator, while the axis of ordintates indicates the extinction ratio (dB) and the small signal chirping parameter (small signal $\alpha$). In addition, FIG. 19 shows the dependence of the extinction ratio (curved solid line) and the small signal chirping parameter (small signal $\alpha$) (curved dotted line) on the voltage applied to the heater 510 for adjusting the operating temperature of the modulator when the electric power (heater power) applied to the optical modulator is changed from 0 to 100 and to 200 mW. As the heater power is increased, the extinction ratio is decreased, and the value of the small signal $\alpha$ is also reduced. This is because rises in the temperature of the heater increase the absorption edge wavelength of the optical modulator, thereby reducing the amount of detuning between the signal light wavelength and the absorption edge wavelength.

Figure 20:
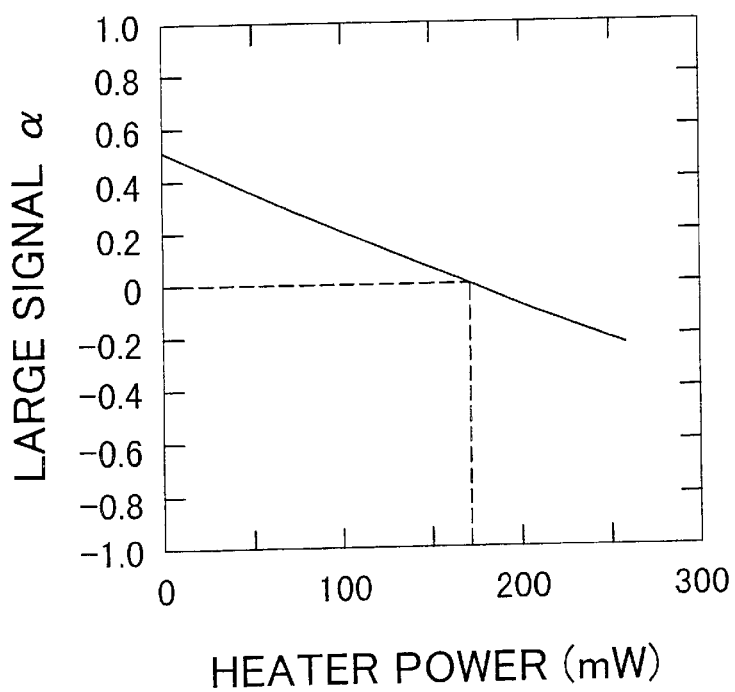
FIG. 20 shows the relation between the heater power of an optical modulator according to the present invention and a large signal chirping parameter.

FIG. 20 shows the dependence of the effective chirping parameter (large signal $\alpha$) on the heater power when rapid modulation is performed with an offset voltage of 0.3 V and a modulation amplitude of 2 Vpp. The large signal $\alpha$ can be continuously controlled in a range between ±0.5 and −0.2 by adjusting the heater power in a range of 0 to 250 mW. Therefore, it is possible to maintain the large singal chirping parameter $\alpha$ at zero by adjusting the heater power.

FIGS. 19 and 20 are mere examples; however, the chirping effects of an optical transmitter can be effectively eliminated by setting the voltage applied to the optical modulator of the optical transmitter and the heater power while taking the above-mentioned relations into account. Specifically, the relations described above are: (1) the relation between the extinction ratio or the small signal chirping parameter of the optical modulator and the voltage applied to the optical modulator; (2) the relation between the large signal chirping parameter and the heater power-of the heater for adjusting the temperature of the optical modulator. The present invention is the first to realize the above setting of the optical transmitter operation. As described above, a temperature control means provided for an optical modulator region is extremely useful in practical use.

Incidentally, as shown in FIG. 19, the extinction curve becomes steep as the heater power is increased. This might cause a drop in the cross point in the modulated waveform. However, this problem can be essentially avoided by using a normal cross point variable type modulation driving electronic circuit or the like.

The configuration described above has made it possible to realize a transmitter that allows a wavelength multiplexing optical communication system to readily achieve higher transmission speed and longer transmission distance.

Seventh Embodiment

Figure 21:
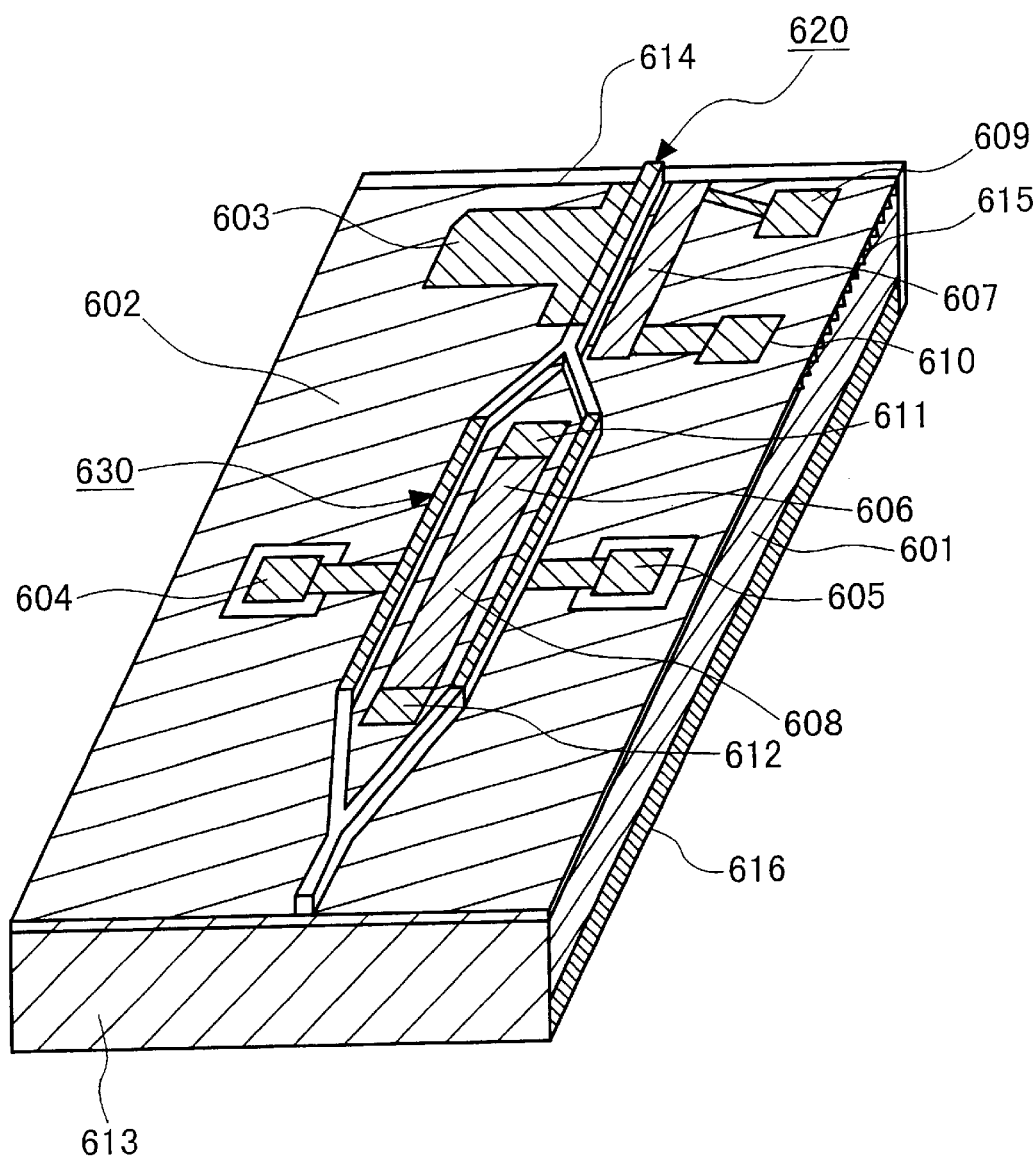
FIG. 21 is a perspective view of a semiconductor optical device with an optical interference type optical modulator according to the present invention.

FIG. 21 is a perspective view of a monolithic integrated device with an optical interference type optical modulator and a distributed feedback laser device. In this embodiment, the configuration of the monolithic integrated device with the electric field absorption type optical modulator and the distributed feedback laser device as shown in FIG. 17 is replaced with that of a monolithic integrated device with an optical interference type optical modulator and a distributed feedback laser device.

In this embodiment, there are mounted on a semiconductor substrate 601 a semiconductor laser device 620 and an optical interference type optical modulator 630 which is optically connected to the semiconductor laser device 620. The semiconductor laser device 620 has a diffraction grating 615 formed in a desired region of the semiconductor substrate 601, on top of which a light emission active layer region 621 with a desired multi-quantum well structure is formed. An upper electrode 603 is provided for the light emission active layer region 621, and a lower electrode 616 is provided on the lower side of the semiconductor substrate 601. In the example of the above optical interference type optical modulator, on the other hand, phase modulation wave guides 606 and 607 are formed into specified shapes, and electrodes 604 and 605 for the optical modulator are provided for each of the phase modulation wave guides 606 and 607. This configuration usually represents a Mach-Zehnder interference type modulator. The Mach-Zehnder interference type modulator modulates the intensity of light by using the interference of light propagating in two optical wave guides. While the light phase difference between the optical wave guides is maintained at $\pi$, the voltages applied to the two optical wave guides are varied independently of each other to change the refractive indexes of the optical wave guides. The change in the refractive indexes in turn controls the conditions of the light phases.

The light emission side of the present optical semiconductor apparatus is covered with a low-reflection film 613, while the opposite laser device side is covered with a high-reflection film 614. Incidentally, desired sections on the upper surface of the optical semiconductor apparatus are covered with a silicon dioxide film, which serves as a passivation film 602.

Heaters 607 and 608 are provided as temperature control means for locally controlling the temperature of each of the semiconductor laser device 620 and the optical modulator 630, which characterize the present invention. Heater pads 609, 610, 611, and 612 are provided for the heaters 607 and

608. The heaters are formed with thin films of platinum (Pt) or titanium (Ti).

The basic configuration in this embodiment has the normal distributed feedback laser device 620 and the optical interference type optical modulator 630 placed on the semiconductor substrate side by side with each other, and the structures other than that of the means for local temperature control are commonly known. Therefore, further detailed descriptions will be omitted.

In this embodiment, the difference between the signal wavelength and the absorption edge wavelength (amount of detuning) can be adjusted to within a range of 70±3 nm at all times by passing a current through the laser wavelength control electrode 607 and the heater 608 for adjusting the operating temperature of the modulator in series, and adjusting the resistance value of each of them in such a way that a desired heater power is obtained. The setting of the heater power is the same as that described in the fifth embodiment. As a result, the chirping parameter which determines the fiber transmission characteristics of the present optical transmitter can be controlled to within a range of 0.6±0.1 at all times.

Thus, higher transmission speed and longer transmission distance of a wavelength multiplexing optical communication system can be readily achieved.

The configuration described above has made it possible to realize a transmitter that allows a wavelength multiplexing optical communication system to readily achieve higher transmission speed and longer transmission distance.

Eighth Embodiment

Figure 22:
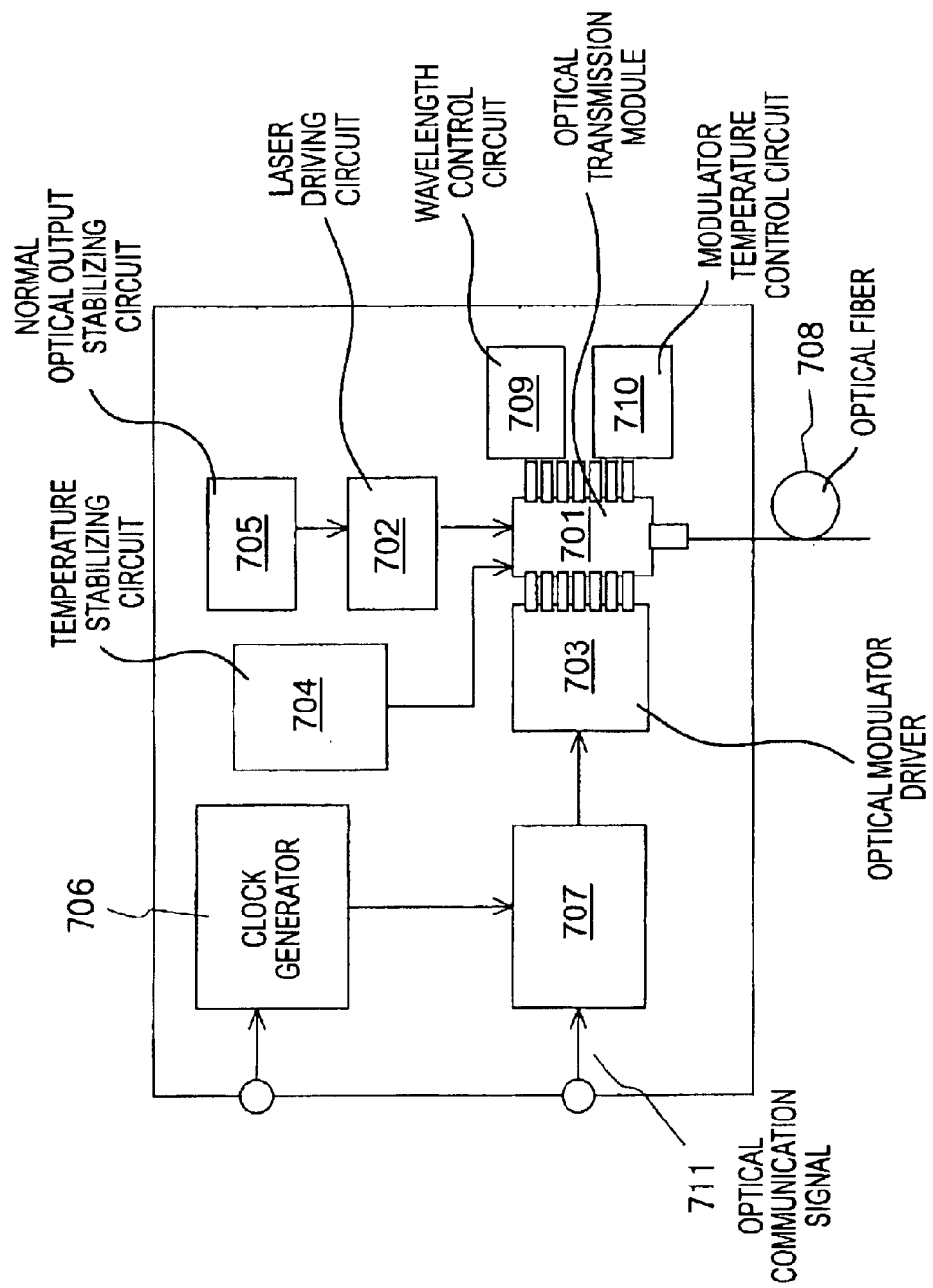
FIG. 22 is a schematically constitutional view of an optical transmitter according to the present invention.

This embodiment illustrates an optical transmission apparatus according to the present invention. FIG. 22 shows the schematically constitutional view of the optical transmission apparatus operating in a 1.55 μm wavelength band.

In the optical transmission apparatus of this embodiment, light is transmitted from an optical transmission module 701 via an optical fiber 708. For the optical transmission module 701, the various light emission apparatus described so far can be used. The optical transmission module 701 has a semiconductor laser device and an optical modulator. In order to drive the semiconductor laser device and the optical modulator, a laser driving circuit 702 and an optical modulator driver 703 are connected to the semiconductor laser device and the optical modulator, respectively. Incidentally, the semiconductor laser device is provided with a normal optical output stabilizing circuit 705. In addition, a wavelength control circuit 709 and a modulator temperature control circuit 710 are connected to each of the temperature control means provided for the semiconductor laser device and the optical modulator according to the present invention. The optical transmission module 701 is mounted on the top of the temperature control means comprising Peltier elements. Also the optical transmission module 701 is connected to a temperature stabilizing circuit 704.

Meanwhile, a signal 711 for optical communication is inputted, together with the clock signal from a clock generator 706, into the optical modulator driver 703.

Incidentally, the configuration of this embodiment according to the present invention other than that of the optical transmitter is a normal one, and therefore its detailed description will be omitted. Also the optical transmitter has been previously described in detail.

The configuration of the present embodiment makes it possible to realize at low cost a highly reliable light source apparatus for wavelength multiplexing transmission that does not affect the modulation signal characteristics or the fiber transmission characteristics even when the wavelength is changed.

Ninth Embodiment

Figure 23:
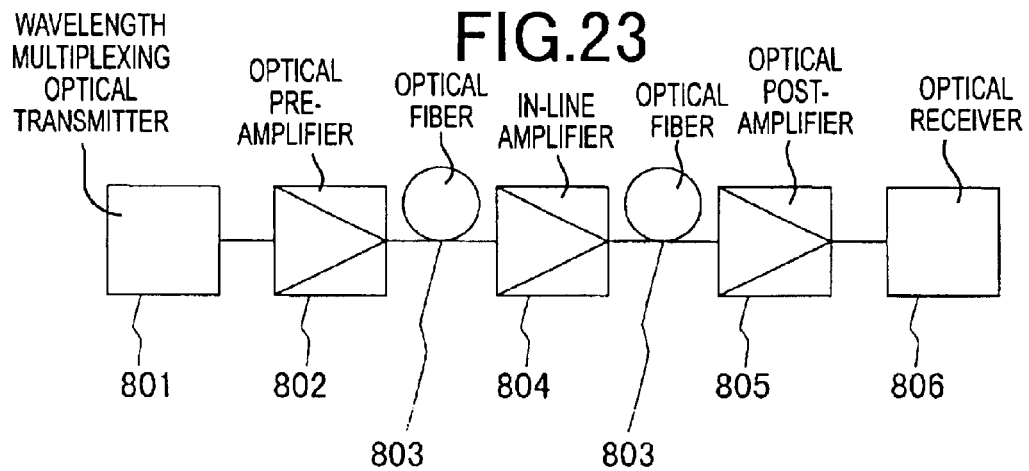
FIG. 23 shows an example of an optical communication system according to the present invention.
Figure 24:
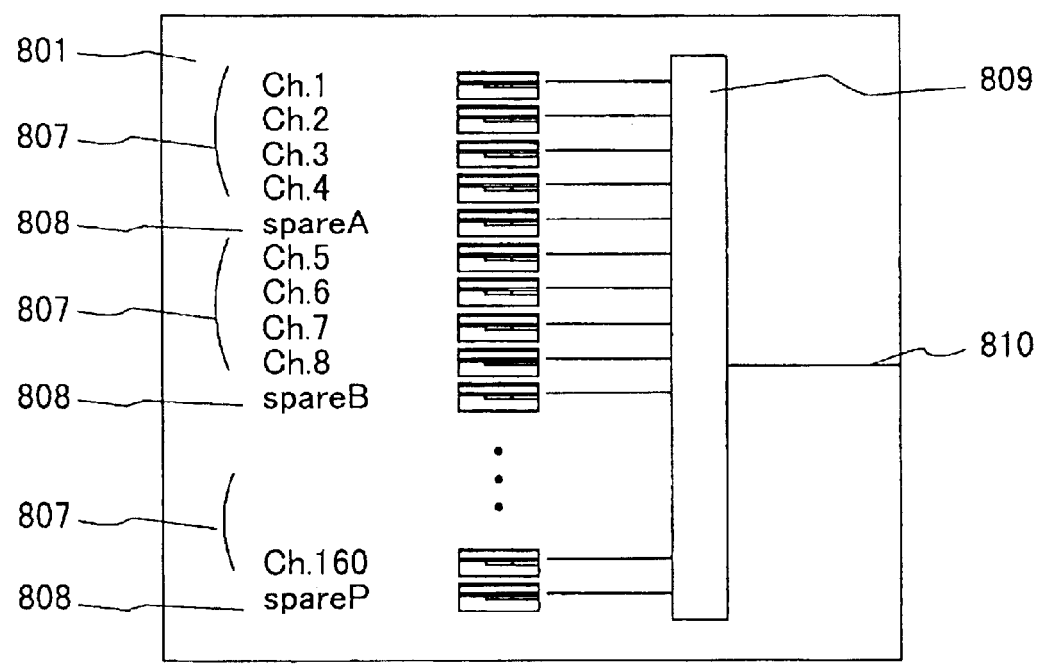
FIG. 24 is a plan arrangement view of a wavelength multiplexing optical transmitter according to the present invention.

This embodiment illustrates a wavelength multiplexing optical transmission apparatus according the present invention. The wavelength band of the optical transmitter is a 1.55 μm band. FIG. 23 shows the configuration of the essential parts of the optical communication system. FIG. 24 is an internal configuration view of the wavelength multiplexing optical transmission apparatus used in the above optical communication system. The optical transmission light source in this embodiment is formed with light sources with fixed wavelengths. Since light sources with fixed wavelengths are used in this embodiment, spare light sources are provided in case of failure.

The optical communication system illustrated in FIG. 23 is formed with a wavelength multiplexing optical transmitter 801, an optical pre-amplifier 802, an optical fiber 803, an in-line amplifier 804, an optical post-amplifier 805, and an optical receiver 806.

Each of the transmission light sources uses a normal light source 807 with a fixed wavelength. More specifically, a plurality of distributed feedback semiconductor laser devices are used for the light sources with fixed wavelengths. The oscillation wavelength of each channel falls in a range of 1532.29 nm to 1597.19 nm, with intervals of 50 GHz between the channels, and a total of 160 channels are provided. Each of the channels is indicated with Ch.1, Ch.2, or the like. Signal light from each channel light source is multiplexed into a single fiber 810 by using a multiplexer 809 with a diffraction grating using a normal array wave guide.

The apparatus in this embodiment has a backup configuration using the optical transmission light source illustrated in the eighth embodiment as a spare light source 808. In FIG. 24, the spare light source 808 is illustrated with spareA, spareB, or the like. Here, if one of the light sources 807 with fixed wavelengths is subjected to failure, the pertinent spare light source 808 functions as a substitute light source for the failed light source. This is where the wavelength adjustment function of a semiconductor laser device according to the present invention proves extremely useful. Specifically, if the wavelength of the failed light source is $\lambda 10$, and the oscillation wavelength of the spare light source 808 is supposed to be $\lambda 11$, the oscillation wavelength $\lambda 11$ is adjusted to the above oscillation wavelength $\lambda 10$ by the means for locally controlling the temperature of the semiconductor laser device according to the present invention.

In this embodiment, a single spare light source has a wavelength variable range of about 4 nm, and covers 10 channels. Therefore, only 160 spare light sources are provided for a total of 160 channels. Thus, this configuration can decrease the size of the apparatus and improve economy, as compared with the conventional configuration in which spare parts are provided for all channels. This simple configuration allows the wavelength of the light wave signal of each channel to be set and stabilized at a desired value by using a simple method. Thus, a highly reliable wavelength multiplexing transmission system can be realized at low cost, as compared with a conventional system, even if the number of channel wavelengths is increased.

Tenth Embodiment

Figure 25:
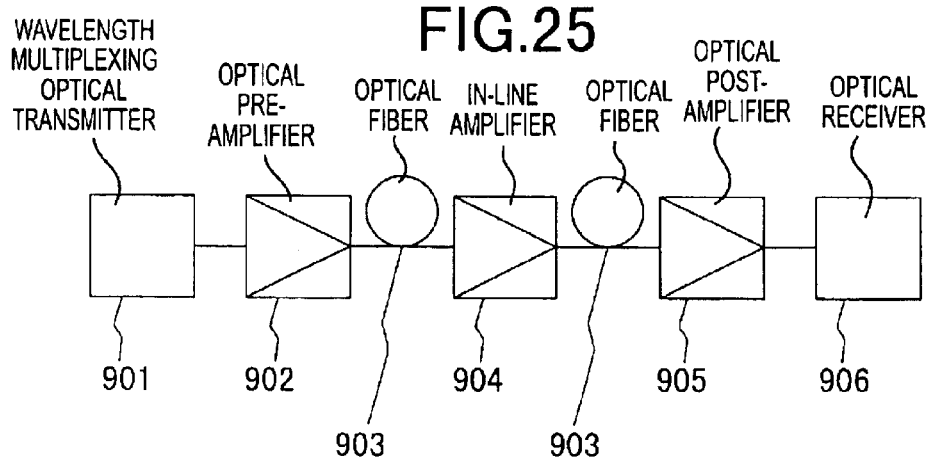
FIG. 25 shows another example of an optical communication system according to the present invention.
Figure 26:
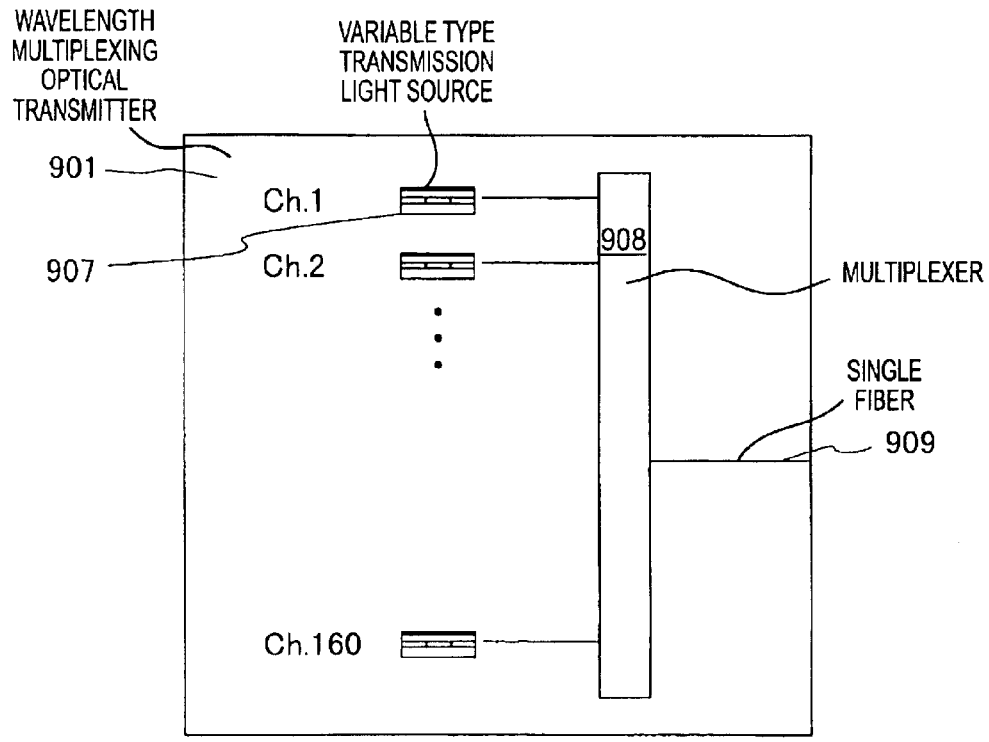
FIG. 26 is a plan arrangement view of a wavelength multiplexing optical transmitter according to the present invention.

This embodiment uses a wavelength variable type optical transmission light source. Therefore variations in wavelength can be adjusted by the light source itself. The wavelength band of the light source is a 1.55 μm band. FIG. 25 shows the configuration of the essential parts of the optical communication system. FIG. 26 is an internal arrangement view of the wavelength multiplexing optical transmitter used in the above optical communication system.

The optical transmission apparatus illustrated in FIG. 25 is formed with a wavelength multiplexing optical transmitter 901, an optical pre-amplifier 902, an optical fiber 903, an in-line amplifier 904, an optical post-amplifier 905, and an optical receiver 906. The basic configuration of the optical transmission apparatus is the same as that described in the nineth embodiment. FIG. 26 is an internal arrangement view of the wavelength multiplexing optical transmitter 901. For the transmission light source of the wavelength multiplexing optical transmitter 901, a wavelength variable type transmission light source 907, similar to the light source described in eighth embodiment, is used. Each of the light sources is of the wavelength variable type, and therefore it can be readily adjusted to the specified wavelength grid. The oscillation wavelength of each channel falls in a range of 1532.29 nm to 1597.19 nm, with intervals of 50 GHz between the channels, and a total of 160 channels are provided. Signal light from each channel light source is multiplexed into a single fiber 909 by using a multiplexer 908 with a normal array wave guide diffraction grating.

The simple configuration as described in the present embodiment allows the wavelength of the light wave signal of each channel to be set and stabilized at a desired value by using a simple method. Thus, highly reliable wavelength multiplexing transmission can be realized at low cost, as compared with a conventional system, even if the number of channel wavelengths is increased.

As described above, according to the wavelength multiplexing communication apparatus of the present invention, high-quality signal transmission with uniform signal qualities between the channels can be realized by a simple method. Moreover, a highly reliable optical transmitter which is especially excellent in the wavelength lineup of the semiconductor laser, or the transmission light source, can be realized at low cost.

The present invention provides an optical transmitter that makes it possible to control the wavelength of the light source, provide an optical modulation means for rapid optical modulation, control the chirping characteristics of the optical modulator, and the like.

Another aspect of the present invention provides an optical transmitter suitable to realize light sources for wavelength multiplexing communication with high reproducibility, as well as a wavelength multiplexing transmission apparatus using the above optical transmitter. This method will enable minute tuning in optical communication.

Yet another aspect of the present invention provides an optical transmitter suitable for long-distance transmission and simple methods for realizing the optical transmitter.

Eleventh Embodimen

Figure 27:
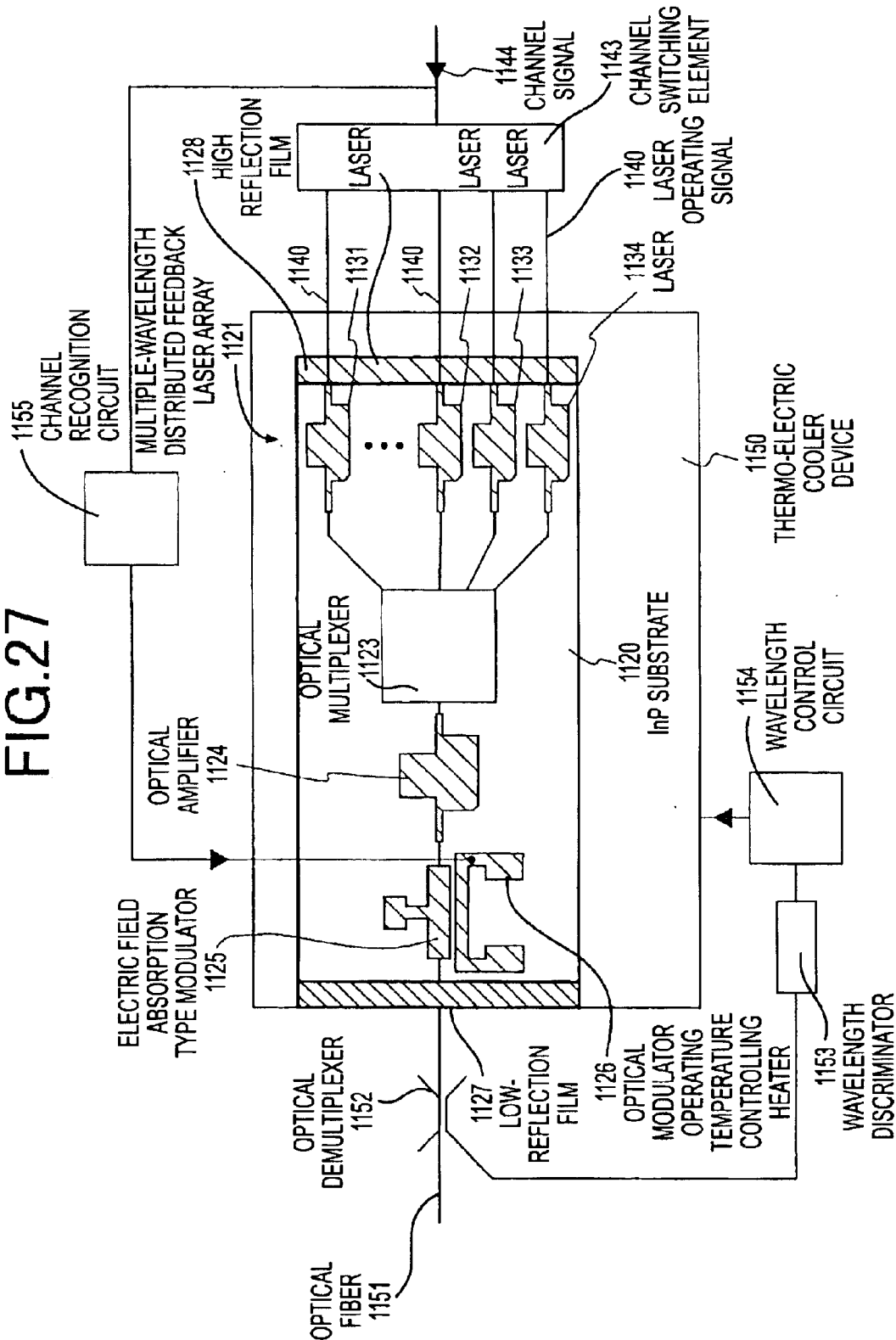
FIG. 27 is a plan arrangement view of an another wavelength multiplexing optical transmitter according to the present invention.
Figure 28:
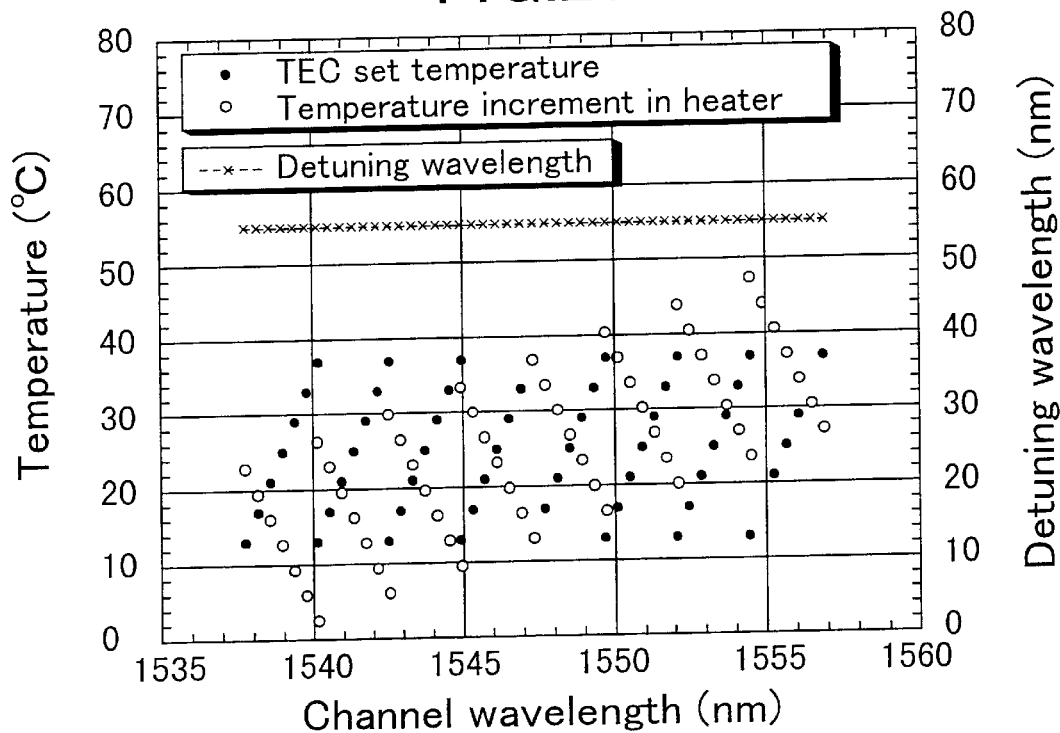
FIG. 28 is a drawing showing relationships between channel wavelength and temperature, and between channel wavelength and detuning wavelength.
Figure 29:
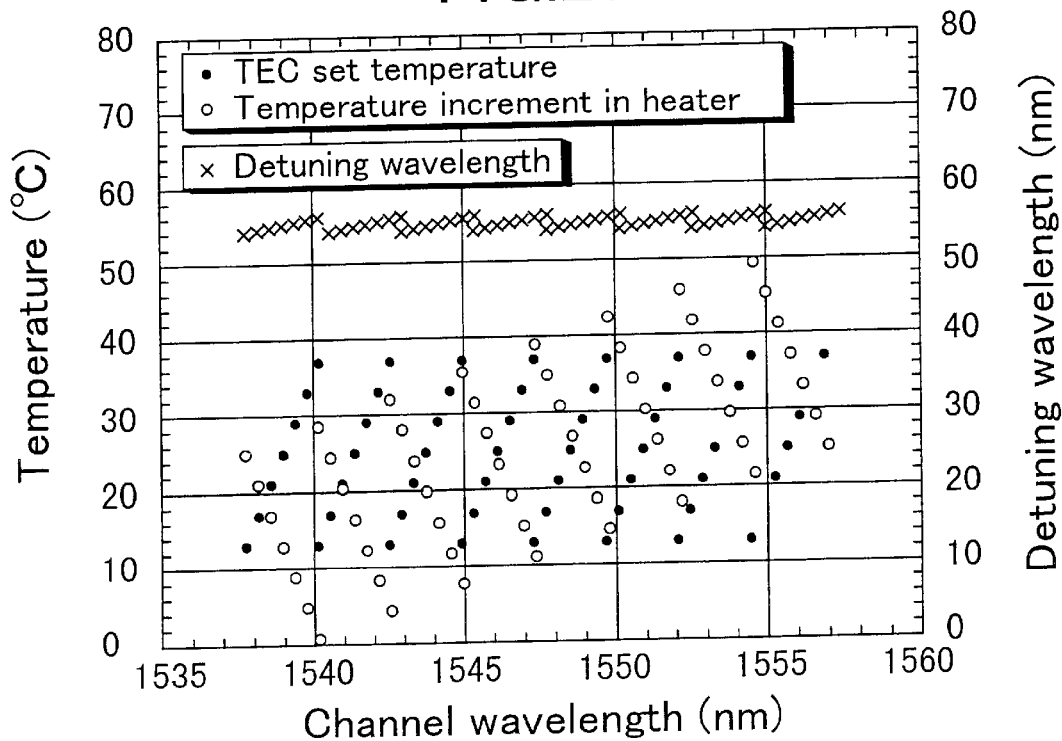
FIG. 29 is an another drawing showing relationships between channel wavelength and temperature, and between channel wavelength and detuning wavelength.

Shown in FIG. 27 is another embodiment of 1.55 μm multi-wavelength transmitter. The optical device employed in this transmitter is similar to that described in FIG. 2, except for the lack of thin film heaters in the laser array section. In this case, the wavelength tuning is achieved by controlling the set temperature of thermo-electric cooler device 1150 on which the optical device is installed, while it is based on thin film heaters in the case of FIG. 2. As shown in FIGS. 28 and 29, an exact ITU channel wavelength can be attained by selecting a corresponding channel and by using a wavelength discriminator 1153/stabilizing circuit 1154 combination. Here, we can have a uniform detuning distribution by adjusting a heater current thus properly controlling the modulator temperature so that the modulator performance is kept unchanged during the wavelength tuning range.

Twelfth Embodiment

Figure 30:
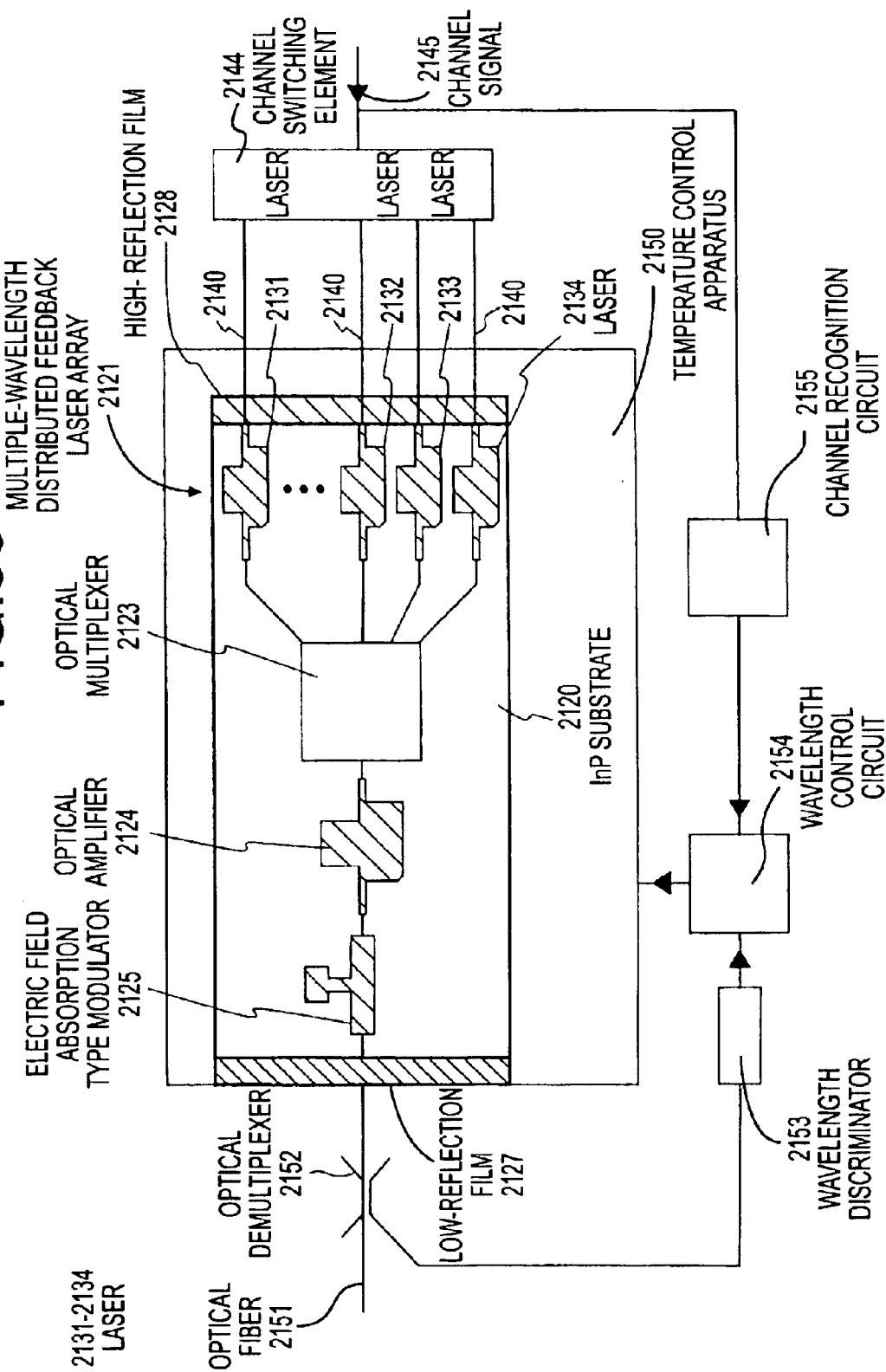
FIG. 30 is a plan arrangement view of an another wavelength multiplexing optical transmitter according to the present invention.

Shown in FIG. 30 is another embodiment of 1.55 um multi-wavelength transmitter. The optical device employed in this transmitter is similar to that described in FIG. 2, except for the lack of thin film heaters in the modulator- and laser array-sections.

Figure 31:
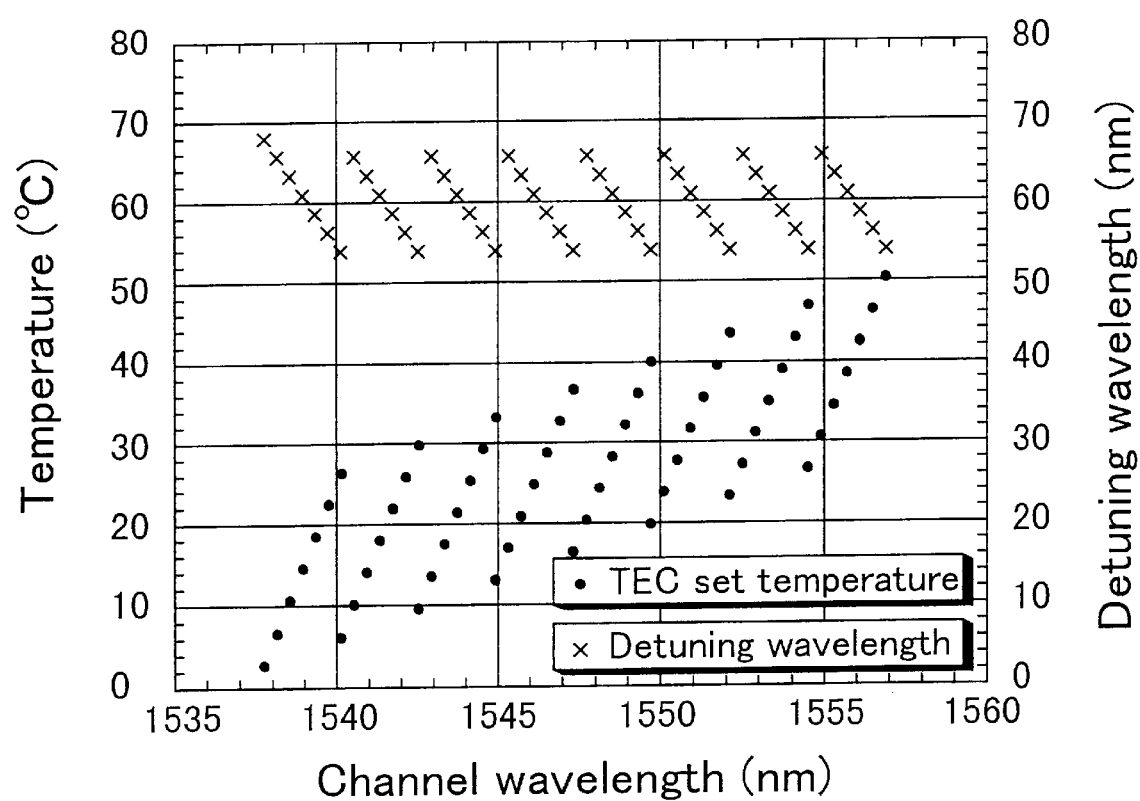
FIG. 31 is an another drawing showing relationships between channel wavelength and temperature, and between channel wavelength and detuning wavelength.

In this case, the wavelength tuning is achieved by controlling the set temperature of thermo-electric cooler device 2150 on which the optical device is installed, while it is based on thin film heaters in the case of FIG. 2. As shown in FIG. 31, an exact ITU channel wavelength can be attained by selecting a corresponding channel and by using a wavelength discriminator 1153/stabilizing circuit 1154 combination. Here, the lasing wavelength of the laser array is adjusted in advance so that the longer wavelength channels can match the designated ITU grids at higher temperature of thermo-electric cooler. This configuration is easily achieved by adjusting the difference of the corrugation pitch of neighboring distributed feedback lasers (with the wavelength difference of $\Delta\lambda$) to be $\Delta\lambda/2/Neq*(1-d\ \lambda p/dT/d\ \lambda g/dT)$, instead of the standard value of $\Delta\lambda/2/Neq$, where Neq is the equivalent index of the active waveguide, $d\ \lambda p/dT$ and $d\ \lambda g/dT$ are the temperature coefficients of the lasing wavelength and of the modulator bandgap wavelength, respectively.

With this set-up, a single thermoelectric cooler device can do wavelength tuning while the detuning is kept almost constant as shown in FIG. 31.

In order to facilitate understanding of the drawings, description of essential reference numerals is provided as follows:

101 . . . casing, 102 . . . temperature adjuster, 103 . . . monitoring photodetector, 104 . . . electric input line, 105 . . . semiconductor optical device mounting substrate, 106 . . . semiconductor optical device, 107 . . . optical lens, 108 . . . optical isolator, 109 . . . optical fiber, 110 . . . fiber sleeve, 120 . . . substrate, 121 . . . multiple wavelength distributed feedback laser array, 122 . . . laser oscillation wavelength controlling heater, 123 . . . optical multiplexer, 124 . . . optical amplifier, 125 . . . electric field absorption type modulator, 126 . . . optical modulator operating temperature controlling heater, 127 . . . low-reflection film, 128 . . . high-reflection film, 201 . . . semiconductor optical device, 202 . . . multiple wavelength distributed feedback laser array, 203 . . . laser oscillation wavelength controlling heater, 204 . . . optical multiplexer, 205 . . . electric field absorption type modulator, 206 . . . optical modulator operating temperature controlling heater, 211 . . . semiconductor substrate, 212 diffraction grating, 213 . . . laser active layer, 214 optical modulator absorption layer, 215 . . . p-type cladding layer, 216 . . . optical multiplexer core layer, 217 . . . undoped cladding layer, 218 . . . low-reflection film, 219 . . . high-reflection film, 301 . . . semiconductor substrate, 302 . . . laser active layer, 303 . . . distributed reflector core layer, 304 distributed reflector core layer, 305 . . . long period super lattice structure diffraction grating, 306 . . . phase adjustment region, 307 . . . optical modulator operating temperature controlling heater, 308 . . . electric field absorption type modulator electrode, 309 . . . low-reflection film, 401 . . . substrate, 402 . . . laser active layer, 403 . . . optical modulator absorption layer, 404 . . . array diffraction grating core layer, 405 . . . diffraction grating, 406 . . . phase adjuster, 407 . . . p-type cladding layer, 408 . . . undoped cladding layer, 409 . . . low-reflection film, 410 . . . high-reflection film, 411 . . . laser electrode, 412 . . . phase adjustment electrode, 413 . . . distributed reflector electrode, 414 . . . modulator electrode, 415 . . . array wave guide diffraction grating, 416 . . . heater electrode, 501 . . . InP substrate, 502 . . . silicon oxide film, 503 . . . laser electrode, 504 . . . modulator electrode, 505 . . . low-capacity pad, 506 . . . heater pad, 507 . . . heater pad, 508 . . . heater pad, 509 . . . laser wavelength controlling heater, 510 . . . optical modulator operating temperature controlling heater, 511 low-reflection film, 512 high-reflection film, 521 . . . multi-quantum well active layer, 522 . . . diffraction grating, 531 multi-quantum well active layer, 532 . . . diffraction grating, 541 . . . multi-quantum well active layer, 542 . . . multi-quantum well active layer, 543 . . . diffraction grating, 601 substrate, 602 . . . silicon oxide film, 603 laser electrode, 604 . . . modulator electrode, 605 . . . diffraction grating, 606 . . . phase modulation wave guide, 607 . . . laser wavelength controlling heater, 608 . . . optical modulator operating temperature controlling heater, 609 . . . heater pad, 610 low-reflection film, 611 . . . high-reflection film, 701 . . . optical transmission module, 702 . . . laser driving circuit, 703 . . . modulator driver, 704 . . . temperature stabilizing circuit, 705 . . . optical output stabilizing circuit, 706 . . . clock generator, 707 . . . multiplexer, 708 . . . optical fiber, 709 . . . wavelength control circuit, 710 . . . modulator temperature control circuit, 801 . . . wavelength multiplexing optical transmitter, 802 . . . optical pre-amplifier, 803 . . . optical fiber, 804 . . . in-line amplifier, 805 . . . optical post-amplifier, 806 . . . optical receiver, 807 . . . main signal transmission light source, 808 . . . spare wavelength variable type transmission light source, 809 . . . multiplexer, 901 . . . wavelength multiplexing optical transmitter, 902 . . . optical pre-amplifier, 903 . . . optical fiber, 904 . . . in-line amplifier, 905 . . . optical post-amplifier, 906 . . . optical receiver, 907 main signal wavelength variable type transmission light source, 908 . . . multiplexer.

1120 . . . InP substrate, 1121 . . . multiple-wavelength distributed feedback laser array, 1123 . . . optical multiplexer 1124 . . . optical amplifier 1125 . . . electric field absorption type modulator, 1126 . . . optical modulator operating temperature controlling heater, 1127 . . . low-reflection film 1128 . . . high-reflection film 1131–1134 . . . lasers 1140 . . . laser operating signal, 1143 . . . channel switching element 1144 channel signal 1150 . . . temperature control apparatus 1151 optical fiber, 1152 . . . optical demultiplexer, 1153 . . . wavelength discriminator, 1154 . . . wavelength control circuits 1155. . . channel recognition circuit 2120 . . . InP substrate, 2121 . . . multiple-wavelength distributed feedback laser array, 2123 . . . optical multiplexer 2124 . . . optical amplifier, 2125 . . . electric field absorption type modulator, 2127 low-reflection film, 2128 high-reflection film, 2131–2134 . . . laser 2124 . . . laser operating signal, 2144 . . . channel switching element, 2145 . . . channel signal, 2150 . . . temperature control apparatus, 2151 . . . optical fiber, 2152 . . . optical demultiplexer, 2153 . . . wavelength discriminator, 2154 . . . wavelength control circuit, 2155 . . . channel recognition circuit.

What is claimed is:

1. An optical transmitter comprising:
a semiconductor laser device;
an optical modulator region optically connected to said semiconductor laser device and having the function of modulating the output light from said semiconductor laser device;
a first temperature controller for changing the operating temperature of said semiconductor laser device while maintaining a desired oscillation wavelength of said semiconductor laser device; and
a second temperature controller for controlling the operating temperature of said optical modulator region independently of said semiconductor laser device, the second temperature controller being formed near said optical modulator region and separately from said first temperature controller, and wherein
a difference in the amount of variation between the wavelength of the light incident on the optical modulator region and the absorption edge wavelength of the optical modulator region is controlled within ±7 nm by use of said second temperature controller.

2. An optical transmitter as claimed in claim 1, further comprising a means for controlling a difference between the oscillation wavelength of the light from said semiconductor laser device and the band gap wavelength of said optical modulator region to within ±7 nm.

3. An optical transmitter as claimed in claim 1, wherein the operating temperature of said optical modulator region is controlled while maintaining the operating wavelength of said semiconductor laser device within ±1 nm.

4. An optical transmitter as claimed in claim 3, further comprising a means for changing the operating temperature of said optical modulator in such a way as to adjust the chirping parameter of said optical modulator region to a desired value.

5. An optical transmitter as claimed in claim 1, wherein the means for changing the operating temperature of said optical modulator region is a heater provided in said optical modulator region.

6. An optical transmitter as claimed in claim 1, further comprising a means for controlling the operating temperature of said semiconductor laser device, said means being located in said semiconductor laser device region.

7. An optical transmitter as claimed in claim 6, wherein the means for controlling the operating temperature of said semiconductor laser device and the means for changing the operating temperature of said optical modulator region can be controlled independently of each other.

8. An optical transmitter as claimed in claim 6, wherein the means for controlling the operating temperature of said semiconductor laser device is a heater provided in said semiconductor laser device region.

9. An optical transmitter as claimed in claim 8, wherein the ratio of the resistance value $R_{LD}$ of the heater provided in said semiconductor laser device region to the resistance value $R_{MOD}$ of the heater provided in said optical modulator region is 4:1 to 10:1.

10. An optical transmitter as claimed in claim 6, wherein the means for controlling the operating temperature of said semiconductor laser device and the means for changing the operating temperature of said optical modulator region are heaters connected in series with each other.

11. An optical transmitter as claimed in claim 1, wherein said semiconductor laser device is of a distributed feedback type or a distributed reflection type, and said optical modulator is of an electric field absorption type or an optical interference type being formed with semiconductor material.

12. An optical transmitter as claimed in claim 1, wherein said semiconductor laser device and said optical modulator region are formed with compound semiconductor material on the top of an InP substrate.

13. An optical transmitter as claimed in claim 12, wherein said compound semiconductor material forming said semiconductor laser device and said optical modulator region is InGaAlAs or InGaAsP.

14. An optical transmitter as claimed in claim 1, further comprising a temperature stabilization apparatus for maintaining the internal temperature of an optical semiconductor device at a constant level and a means for monitoring optical output.

15. An optical transmitter comprising:

a semiconductor laser device;

an optical modulator region optically connected to said semiconductor laser device and having the function of modulating the output light from said semiconductor laser device;

a first temperature controller for changing the operating temperature of said semiconductor laser device while maintaining a desired oscillation wavelength of said semiconductor laser device; and a second temperature controller for controlling the operating temperature of said optical modulator region independently of said semiconductor laser device as the wavelength of the light incident on said optical modulator region is changed, the second temperature controller being formed near said optical modulator region and separately from said first temperature controller, and wherein a difference in the amount of variation between the wavelength of the light incident on the optical modulator region and the absorption edge wavelength of the optical modulator region is controlled within ±7 nm by use of said second temperature controller.

16. An optical transmitter comprising:

a semiconductor laser device;

an optical modulator region optically connected to said semiconductor laser device and having the function of modulating the output light from said semiconductor laser device;

a first temperature controller for changing the operating temperature of said semiconductor laser device while maintaining a desired oscillation wavelength of said semiconductor laser device; and a second temperature controller for controlling the operating temperature of said optical modulator region independently of said semiconductor laser device, the second temperature controller being formed near said optical modulator region and separately from said first temperature controller, and wherein a difference in the amount of variation between the wavelength of the light incident on the optical modulator region and the absorption edge wavelength of the optical modulator region is controlled within ±7 nm by use of said second temperature controller; and which transmits information by propagating a light wave signal with at least two different wavelengths or more on the same optical transmission line.

17. An optical transmitter comprising:

a semiconductor laser device;

an optical modulator region optically connected to said semiconductor laser device and having the function of modulating the output light from said semiconductor laser device;

a first temperature controller for changing the operating temperature of said semiconductor laser device while maintaining a desired oscillation wavelength of said semiconductor laser device; and a second temperature controller for controlling the operating temperature of said optical modulator region independently of said semiconductor laser device, the second temperature controller being formed near said optical modulator region and separately from said first temperature controller, and wherein a difference in the amount of variation between the wavelength of the light incident on the optical modulator region and the absorption edge wavelength of the optical modulator region is controlled within ±7 nm by use of said second temperature controller; and which transmits information by propagating a light wave signal with at least two different wavelengths or more on the same optical transmission line, wherein the interval between adjacent channels is any value from 50 GHz to 100 GHz.

18. An optical transmitter comprising:

a semiconductor laser device;

an optical modulator region optically connected to said semiconductor laser device and having the function of modulating the output light from said semiconductor laser device;

a first temperature controller for changing the operating temperature of said semiconductor laser device while maintaining a desired oscillation wavelength of said semiconductor laser device; and a second temperature controller for controlling the operating temperature of said optical modulator region independently of said semiconductor laser device, the second temperature controller being formed near said optical modulator region and separately from said first temperature controller, and wherein a difference in the amount of variation between the wavelength of the light incident on the optical modulator region and the absorption edge wavelength of the optical modulator region is controlled within ±7 nm by use of said second temperature controller; and which transmits information by propagating a light wave signal with at least two different wavelengths or more on the same optical transmission line, and has spare light sources with variable oscillation wavelengths to be used as substitute light sources in case a failure should occur in one of the channel light sources of said optical transmitter, whereby if a failure occurs in one of said channel light sources, said spare light source is operated and adjusted to coincide with the wavelength of said failed channel by using a wavelength variable function.

* * * * *